United States Patent
Goodrich et al.

(10) Patent No.: US 12,277,632 B2
(45) Date of Patent: Apr. 15, 2025

(54) AUGMENTED REALITY EXPERIENCES WITH DUAL CAMERAS

(71) Applicant: Snap Inc., Santa Monica, CA (US)

(72) Inventors: Kyle Goodrich, Venice, CA (US); Pedram Javidpour, Los Angeles, CA (US); Maxim Maximov Lazarov, Culver City, CA (US); Andrew James McPhee, Culver City, CA (US); Daniel Moreno, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 25 days.

(21) Appl. No.: 17/662,745

(22) Filed: May 10, 2022

(65) Prior Publication Data

US 2023/0343004 A1    Oct. 26, 2023

Related U.S. Application Data

(60) Provisional application No. 63/334,866, filed on Apr. 26, 2022.

(51) Int. Cl.
*G06T 11/60* (2006.01)
*G06T 19/00* (2011.01)
(Continued)

(52) U.S. Cl.
CPC ............. *G06T 11/60* (2013.01); *H04N 23/45* (2023.01); *H04N 23/62* (2023.01)

(58) Field of Classification Search
CPC .......... G06T 19/006; G06T 7/00; H04N 23/45
See application file for complete search history.

(56) References Cited

U.S. PATENT DOCUMENTS

| 5,604,843 A | 2/1997 | Shaw et al. |
| 5,689,559 A | 11/1997 | Park |

(Continued)

FOREIGN PATENT DOCUMENTS

| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

(Continued)

*Primary Examiner* — Yi Yang
(74) *Attorney, Agent, or Firm* — SCHWEGMAN LUNDBERG & WOESSNER, P.A.

(57) ABSTRACT

Methods and systems are disclosed for generating AR experiences on a messaging platform. The methods and systems perform operations including: detecting a real-world object depicted in a first image captured by a first camera of a client device, the client device comprising a second camera; extracting one or more textures from the real-world object depicted in the first image; selecting a target object depicted in a second image captured by the second camera, the second image being captured by the second camera simultaneously with the first image captured by the first camera; generating an augmented reality (AR) element comprising the target object modified based on the one or more textures extracted from the real-world object depicted in the first image; and causing display of the AR element within the second image.

20 Claims, 14 Drawing Sheets

(51) Int. Cl.
*H04N 23/45* (2023.01)
*H04N 23/62* (2023.01)

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,075,563 B2 | 7/2015 | Kim |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,055,895 B2 | 8/2018 | Li et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,311,644 B2 | 6/2019 | Rodriguez, II |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,460,516 B1 | 10/2019 | Eastham et al. |
| 10,475,225 B2 | 11/2019 | Park et al. |
| 10,504,266 B2 | 12/2019 | Blattner et al. |
| 10,565,795 B2 | 2/2020 | Charlton et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,777,017 B1 | 9/2020 | Saiger et al. |
| 10,805,248 B2 | 10/2020 | Luo et al. |
| 10,872,451 B2 | 12/2020 | Sheth et al. |
| 10,877,293 B1 | 12/2020 | Ardisana, II et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,909,425 B1 | 2/2021 | Brody |
| 10,933,311 B2 | 3/2021 | Brody et al. |
| 10,938,758 B2 | 3/2021 | Allen et al. |
| 10,962,809 B1 | 3/2021 | Castañeda |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 10,997,787 B2 | 5/2021 | Ge et al. |
| 11,006,043 B1 | 5/2021 | Hanover et al. |
| 11,010,022 B2 | 5/2021 | Alvi et al. |
| 11,017,233 B2 | 5/2021 | Charlton et al. |
| 11,030,789 B2 | 6/2021 | Chand et al. |
| 11,036,781 B1 | 6/2021 | Baril et al. |
| 11,063,891 B2 | 7/2021 | Voss |
| 11,063,937 B1 | 7/2021 | Son et al. |
| 11,069,103 B1 | 7/2021 | Blackstock et al. |
| 11,080,917 B2 | 8/2021 | Monroy-hernández et al. |
| 11,087,728 B1 | 8/2021 | Canberk et al. |
| 11,089,427 B1 | 8/2021 | Canberk et al. |
| 11,092,998 B1 | 8/2021 | Castañeda et al. |
| 11,112,945 B1 | 9/2021 | Al Majid et al. |

(56) References Cited

U.S. PATENT DOCUMENTS

| | | |
|---|---|---|
| 11,115,074 B1 | 9/2021 | Olgun |
| 11,128,586 B2 | 9/2021 | Al Majid et al. |
| 11,138,301 B1 | 10/2021 | Castañeda et al. |
| 11,157,076 B1 | 10/2021 | Tham |
| 11,169,374 B1 | 11/2021 | Kubala et al. |
| 11,169,600 B1 | 11/2021 | Canberk et al. |
| 11,176,723 B2 | 11/2021 | Krishnan Gorumkonda et al. |
| 11,176,737 B2 | 11/2021 | Hare et al. |
| 11,188,190 B2 | 11/2021 | Blackstock et al. |
| 11,189,070 B2 | 11/2021 | Jahangiri et al. |
| 11,189,098 B2 | 11/2021 | Hare et al. |
| 11,189,104 B2 | 11/2021 | Goodrich et al. |
| 11,195,341 B1 | 12/2021 | Canberk et al. |
| 11,199,957 B1 | 12/2021 | Alvi et al. |
| 11,218,433 B2 | 1/2022 | Baldwin et al. |
| 11,227,442 B1 | 1/2022 | Goodrich et al. |
| 11,227,637 B1 | 1/2022 | Collins et al. |
| 11,229,849 B2 | 1/2022 | Blackstock et al. |
| 11,232,601 B1 | 1/2022 | Meisenholder |
| 11,238,660 B2 | 2/2022 | Charlton et al. |
| 11,245,658 B2 | 2/2022 | Grantham et al. |
| 11,249,614 B2 | 2/2022 | Brody |
| 11,263,254 B2 | 3/2022 | Baril et al. |
| 11,263,459 B2 | 3/2022 | Li et al. |
| 11,263,817 B1 | 3/2022 | Goodrich et al. |
| 11,270,491 B2 | 3/2022 | Monroy-hernández et al. |
| 11,275,453 B1 | 3/2022 | Tham et al. |
| 11,276,190 B2 | 3/2022 | Duan et al. |
| 11,277,597 B1 | 3/2022 | Canberk et al. |
| 11,282,253 B2 | 3/2022 | Krishnan Gorumkonda et al. |
| 11,284,058 B2 | 3/2022 | Tsau |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2005/0270368 A1 | 12/2005 | Hashimoto |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1* | 8/2009 | Morin ............... A63F 13/12 382/118 |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0168056 A1 | 6/2014 | Swaminathan et al. |
| 2015/0206349 A1 | 7/2015 | Rosenthal et al. |
| 2015/0279113 A1 | 10/2015 | Knorr et al. |
| 2016/0100106 A1* | 4/2016 | Shi ................ H04N 23/45 348/262 |
| 2016/0134840 A1 | 5/2016 | Mcculloch |
| 2016/0234149 A1 | 8/2016 | Tsuda et al. |
| 2017/0039774 A1 | 2/2017 | Estable |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0169617 A1 | 6/2017 | Rodriguez, II |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0068490 A1 | 3/2018 | Holmes |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330756 A1* | 11/2018 | MacDonald .......... G06F 16/951 |
| 2018/0338111 A1 | 11/2018 | Mourkogiannis et al. |
| 2019/0001223 A1 | 1/2019 | Blackstock et al. |
| 2019/0057616 A1 | 2/2019 | Cohen et al. |
| 2019/0068873 A1 | 2/2019 | Rodriguez, II et al. |
| 2019/0097958 A1 | 3/2019 | Collet et al. |
| 2019/0098227 A1 | 3/2019 | Park |
| 2019/0146219 A1 | 5/2019 | Rodriguez, II |
| 2019/0188920 A1 | 6/2019 | Mcphee et al. |
| 2019/0280997 A1 | 9/2019 | Baldwin et al. |
| 2020/0042815 A1 | 2/2020 | Zak et al. |
| 2020/0057804 A1 | 2/2020 | Apanovych et al. |
| 2020/0074738 A1 | 3/2020 | Hare et al. |
| 2020/0118343 A1 | 4/2020 | Koblin et al. |
| 2020/0120269 A1* | 4/2020 | Shirmohamadi ...... H04N 5/272 |
| 2020/0219312 A1 | 7/2020 | Jurgenson et al. |
| 2020/0258313 A1 | 8/2020 | Chen et al. |
| 2020/0306637 A1 | 10/2020 | Baldwin et al. |
| 2020/0311116 A1 | 10/2020 | Anvaripour et al. |
| 2020/0349800 A1* | 11/2020 | Ciardi ................ G06Q 30/0209 |
| 2020/0356760 A1 | 11/2020 | Li et al. |
| 2020/0372127 A1 | 11/2020 | Denton et al. |
| 2020/0410575 A1 | 12/2020 | Grantham et al. |
| 2021/0014407 A1 | 1/2021 | Hanover |
| 2021/0065448 A1 | 3/2021 | Goodrich et al. |
| 2021/0065464 A1 | 3/2021 | Goodrich et al. |
| 2021/0067756 A1 | 3/2021 | Goodrich et al. |
| 2021/0067836 A1 | 3/2021 | Hornsby et al. |
| 2021/0074047 A1 | 3/2021 | Sheth et al. |
| 2021/0076173 A1 | 3/2021 | Monroy-Hernandez et al. |
| 2021/0081088 A1 | 3/2021 | Voss |
| 2021/0089179 A1 | 3/2021 | Grantham et al. |
| 2021/0097743 A1 | 4/2021 | Krishnan Gorumkonda et al. |
| 2021/0099639 A1 | 4/2021 | Bartow et al. |
| 2021/0104087 A1 | 4/2021 | Smith et al. |
| 2021/0150719 A1 | 5/2021 | Cowburn et al. |
| 2021/0165559 A1 | 6/2021 | Voss et al. |
| 2021/0168108 A1 | 6/2021 | Antmen et al. |
| 2021/0170270 A1 | 6/2021 | Brody et al. |
| 2021/0182555 A1 | 6/2021 | Assouline et al. |
| 2021/0192823 A1 | 6/2021 | Amitay et al. |
| 2021/0200497 A1* | 7/2021 | Jovanovic ............. G06F 40/106 |
| 2021/0201392 A1 | 7/2021 | Aghdaii et al. |
| 2021/0209825 A1 | 7/2021 | Assouline et al. |
| 2021/0224050 A1 | 7/2021 | Wang et al. |
| 2021/0225058 A1 | 7/2021 | Chand et al. |
| 2021/0240315 A1 | 8/2021 | Alvi et al. |
| 2021/0240990 A1 | 8/2021 | Charlton et al. |
| 2021/0243482 A1 | 8/2021 | Baril et al. |
| 2021/0243503 A1 | 8/2021 | Kotsopoulos et al. |
| 2021/0258511 A1 | 8/2021 | Goodrich et al. |
| 2021/0266277 A1 | 8/2021 | Allen et al. |
| 2021/0271874 A1 | 9/2021 | Xiong et al. |
| 2021/0272371 A1 | 9/2021 | Chen et al. |

(56) References Cited

U.S. PATENT DOCUMENTS

| | | |
|---|---|---|
| 2021/0281897 A1 | 9/2021 | Brody et al. |
| 2021/0285774 A1 | 9/2021 | Collins et al. |
| 2021/0298440 A1 | 9/2021 | Kim et al. |
| 2021/0303077 A1 | 9/2021 | Anvaripour et al. |
| 2021/0303114 A1 | 9/2021 | Apanovych et al. |
| 2021/0303860 A1 | 9/2021 | Anvaripour et al. |
| 2021/0304369 A1 | 9/2021 | Mccormack et al. |
| 2021/0304449 A1 | 9/2021 | Mourkogiannis |
| 2021/0304450 A1 | 9/2021 | Smith et al. |
| 2021/0304451 A1 | 9/2021 | Fortier et al. |
| 2021/0304505 A1 | 9/2021 | Anvaripour et al. |
| 2021/0304506 A1 | 9/2021 | Mourkogiannis et al. |
| 2021/0304507 A1 | 9/2021 | Smith et al. |
| 2021/0304629 A1 | 9/2021 | Barron et al. |
| 2021/0304754 A1 | 9/2021 | Fortier et al. |
| 2021/0306290 A1 | 9/2021 | Voss |
| 2021/0306386 A1 | 9/2021 | Smith et al. |
| 2021/0306387 A1 | 9/2021 | Smith et al. |
| 2021/0306451 A1 | 9/2021 | Heikkinen et al. |
| 2021/0311318 A1 | 10/2021 | Lin et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0312682 A1 | 10/2021 | Krishnan Gorumkonda et al. |
| 2021/0312690 A1 | 10/2021 | Krishnan Gorumkonda et al. |
| 2021/0319612 A1 | 10/2021 | Monroy-Hernandez et al. |
| 2021/0325691 A1 | 10/2021 | Ashwood |
| 2021/0327117 A1 | 10/2021 | Krokhalev et al. |
| 2021/0328955 A1 | 10/2021 | Collins et al. |
| 2021/0334993 A1 | 10/2021 | Woodford |
| 2021/0335004 A1 | 10/2021 | Zohar et al. |
| 2021/0336908 A1 | 10/2021 | Taitz |
| 2021/0343050 A1 | 11/2021 | Li et al. |
| 2021/0352029 A1 | 11/2021 | Lo et al. |
| 2021/0357075 A1 | 11/2021 | Nayar et al. |
| 2021/0367914 A1 | 11/2021 | Collins et al. |
| 2021/0373843 A1 | 12/2021 | Hornsby et al. |
| 2021/0377205 A1* | 12/2021 | Brown ................ H04L 65/762 |
| 2021/0382585 A1 | 12/2021 | Collins et al. |
| 2021/0382587 A1 | 12/2021 | Heikkinen et al. |
| 2021/0382616 A1 | 12/2021 | Gale et al. |
| 2021/0385180 A1 | 12/2021 | Al Majid et al. |
| 2021/0385417 A1* | 12/2021 | Park ..................... G06F 1/1643 |
| 2021/0387090 A1 | 12/2021 | Eirinberg et al. |
| 2021/0387097 A1 | 12/2021 | Desserrey et al. |
| 2021/0387099 A1 | 12/2021 | Desserrey et al. |
| 2021/0389850 A1 | 12/2021 | Charlton et al. |
| 2021/0389851 A1 | 12/2021 | Al Majid et al. |
| 2021/0389866 A1 | 12/2021 | Al Majid et al. |
| 2021/0390311 A1 | 12/2021 | Barron et al. |
| 2021/0390729 A1 | 12/2021 | Fox-roberts et al. |
| 2021/0390745 A1 | 12/2021 | Rykhliuk et al. |
| 2021/0390784 A1 | 12/2021 | Smith et al. |
| 2021/0392097 A1 | 12/2021 | Ahmed et al. |
| 2021/0392098 A1 | 12/2021 | Gorkin et al. |
| 2021/0392141 A1 | 12/2021 | Mandia |
| 2021/0392459 A1 | 12/2021 | Gorkin et al. |
| 2021/0399911 A1* | 12/2021 | Jorasch ............... H04L 12/1822 |
| 2021/0404831 A1 | 12/2021 | Drummond et al. |
| 2021/0405746 A1 | 12/2021 | Canberk et al. |
| 2021/0405831 A1 | 12/2021 | Mourkogiannis et al. |
| 2021/0405832 A1 | 12/2021 | Brown et al. |
| 2021/0406447 A1 | 12/2021 | Hermann et al. |
| 2021/0406543 A1 | 12/2021 | Drummond et al. |
| 2021/0406965 A1 | 12/2021 | Anvaripour et al. |
| 2021/0407506 A1 | 12/2021 | Drummond et al. |
| 2021/0409357 A1 | 12/2021 | Brody et al. |
| 2021/0409535 A1 | 12/2021 | Mourkogiannis et al. |
| 2021/0409616 A1 | 12/2021 | Chan et al. |
| 2022/0006994 A1* | 1/2022 | Borremans ............ H04N 23/88 |
| 2022/0012929 A1 | 1/2022 | Blackstock et al. |
| 2022/0019640 A1 | 1/2022 | Hermann et al. |
| 2022/0029943 A1 | 1/2022 | Desserrey et al. |
| 2022/0058880 A1 | 2/2022 | Bondich et al. |
| 2022/0070129 A1 | 3/2022 | Boyd et al. |
| 2022/0075591 A1 | 3/2022 | Cardenas Gasca et al. |
| 2022/0075819 A1 | 3/2022 | Boyd et al. |
| 2022/0076492 A1 | 3/2022 | Smith et al. |
| 2022/0078143 A1 | 3/2022 | Eirinberg et al. |
| 2022/0078391 A1 | 3/2022 | Katz et al. |
| 2022/0078402 A1 | 3/2022 | Baron |
| 2022/0083737 A1 | 3/2022 | Apanovych et al. |
| 2022/0084295 A1 | 3/2022 | Smith et al. |
| 2022/0086111 A1 | 3/2022 | Smith et al. |
| 2022/0086367 A1 | 3/2022 | Boyd et al. |
| 2022/0101608 A1 | 3/2022 | Hu et al. |

FOREIGN PATENT DOCUMENTS

| | | |
|---|---|---|
| CN | 110383579 A | 10/2019 |
| CN | 111194428 A | 5/2020 |
| CN | 110495166 B | 11/2020 |
| CN | 112789578 A | 5/2021 |
| EP | 2184092 A2 | 5/2010 |
| EP | 3782124 A1 | 2/2021 |
| EP | 3844718 A1 | 7/2021 |
| EP | 3921806 A1 | 12/2021 |
| JP | 2001230801 A | 8/2001 |
| JP | 5497931 B2 | 3/2014 |
| KR | 101445263 B1 | 9/2014 |
| KR | 20190080904 A | 7/2019 |
| KR | 20190105638 A | 9/2019 |
| KR | 20190136112 A | 12/2019 |
| KR | 20200053606 A | 5/2020 |
| KR | 20200099578 A | 8/2020 |
| KR | 20200106207 A | 9/2020 |
| KR | 20200123238 A | 10/2020 |
| KR | 20200131325 A | 11/2020 |
| KR | 20210063469 A | 6/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2020068383 A1 | 4/2020 |
| WO | WO-2020118050 A1 | 6/2020 |
| WO | WO-2020160261 A1 | 8/2020 |
| WO | WO-2020205246 A1 | 10/2020 |
| WO | WO-2020247174 A1 | 12/2020 |
| WO | WO-2020263489 A1 | 12/2020 |
| WO | WO-2020264184 A1 | 12/2020 |
| WO | WO-2021042134 A1 | 3/2021 |
| WO | WO-2021051134 A1 | 3/2021 |
| WO | WO-2021067988 A1 | 4/2021 |
| WO | WO-2021189068 A1 | 9/2021 |
| WO | WO-2021194855 A1 | 9/2021 |
| WO | WO-2021195404 A1 | 9/2021 |
| WO | WO-2021203118 A1 | 10/2021 |
| WO | WO-2021203120 A1 | 10/2021 |
| WO | WO-2021212133 A1 | 10/2021 |
| WO | WO-2021217167 A1 | 10/2021 |
| WO | WO-2021222198 A1 | 11/2021 |
| WO | WO-2021242688 A1 | 12/2021 |
| WO | WO-2021252201 A2 | 12/2021 |
| WO | WO-2021252217 A1 | 12/2021 |
| WO | WO-2021252218 A1 | 12/2021 |
| WO | WO-2021252237 A1 | 12/2021 |
| WO | WO-2021252242 A2 | 12/2021 |
| WO | WO-2021252386 A1 | 12/2021 |
| WO | WO-2021252501 A1 | 12/2021 |
| WO | WO-2021253048 A1 | 12/2021 |
| WO | WO-2021257401 A1 | 12/2021 |
| WO | WO-2021257455 A1 | 12/2021 |

(56) References Cited

FOREIGN PATENT DOCUMENTS

| | | | |
|---|---|---|---|
| WO | WO-2021257619 A1 | 12/2021 |
| WO | WO-2022005687 A1 | 1/2022 |
| WO | WO-2022005693 A1 | 1/2022 |
| WO | WO-2022005698 A1 | 1/2022 |
| WO | WO-2022005708 A1 | 1/2022 |
| WO | WO-2022005726 A1 | 1/2022 |
| WO | WO-2022005733 A1 | 1/2022 |
| WO | WO-2022005734 A1 | 1/2022 |
| WO | WO-2022005838 A1 | 1/2022 |
| WO | WO-2022005841 A1 | 1/2022 |
| WO | WO-2022005843 A1 | 1/2022 |
| WO | WO-2022005845 A1 | 1/2022 |
| WO | WO-2022005946 A1 | 1/2022 |
| WO | WO-2022005970 A1 | 1/2022 |
| WO | WO-2022006116 A1 | 1/2022 |
| WO | WO-2022006249 A1 | 1/2022 |
| WO | WO-2022006299 A1 | 1/2022 |
| WO | WO-2022015865 A1 | 1/2022 |
| WO | WO-2022036372 A1 | 2/2022 |
| WO | WO-2022047477 A1 | 3/2022 |
| WO | WO-2022055992 A1 | 3/2022 |
| WO | WO-2022056118 A1 | 3/2022 |
| WO | WO-2022056132 A2 | 3/2022 |
| WO | WO-2023211738 A1 | 11/2023 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, John, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmojicustomizable-geofilters-2448152>, (Nov. 18, 2016), 6 pgs.

"International Application Serial No. PCT/US2023/019126, International Search Report mailed Jul. 4, 2023", 4 pgs.

"International Application Serial No. PCT/US2023/019126, Written Opinion mailed Jul. 4, 2023", 5 pgs.

"International Application Serial No. PCT/US2023/019126, International Preliminary Report on Patentability mailed Nov. 7, 2024", 7 pgs.

* cited by examiner

AUGMENTED REALITY EXPERIENCES WITH DUAL CAMERAS

CLAIM OF PRIORITY

This application claims the benefit of priority to U.S. Provisional Application Ser. No. 63/334,866, filed on Apr. 26, 2022, which is incorporated herein by reference in its entirety.

TECHNICAL FIELD

The present disclosure relates generally to generating augmented reality (AR) experiences on messaging applications.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
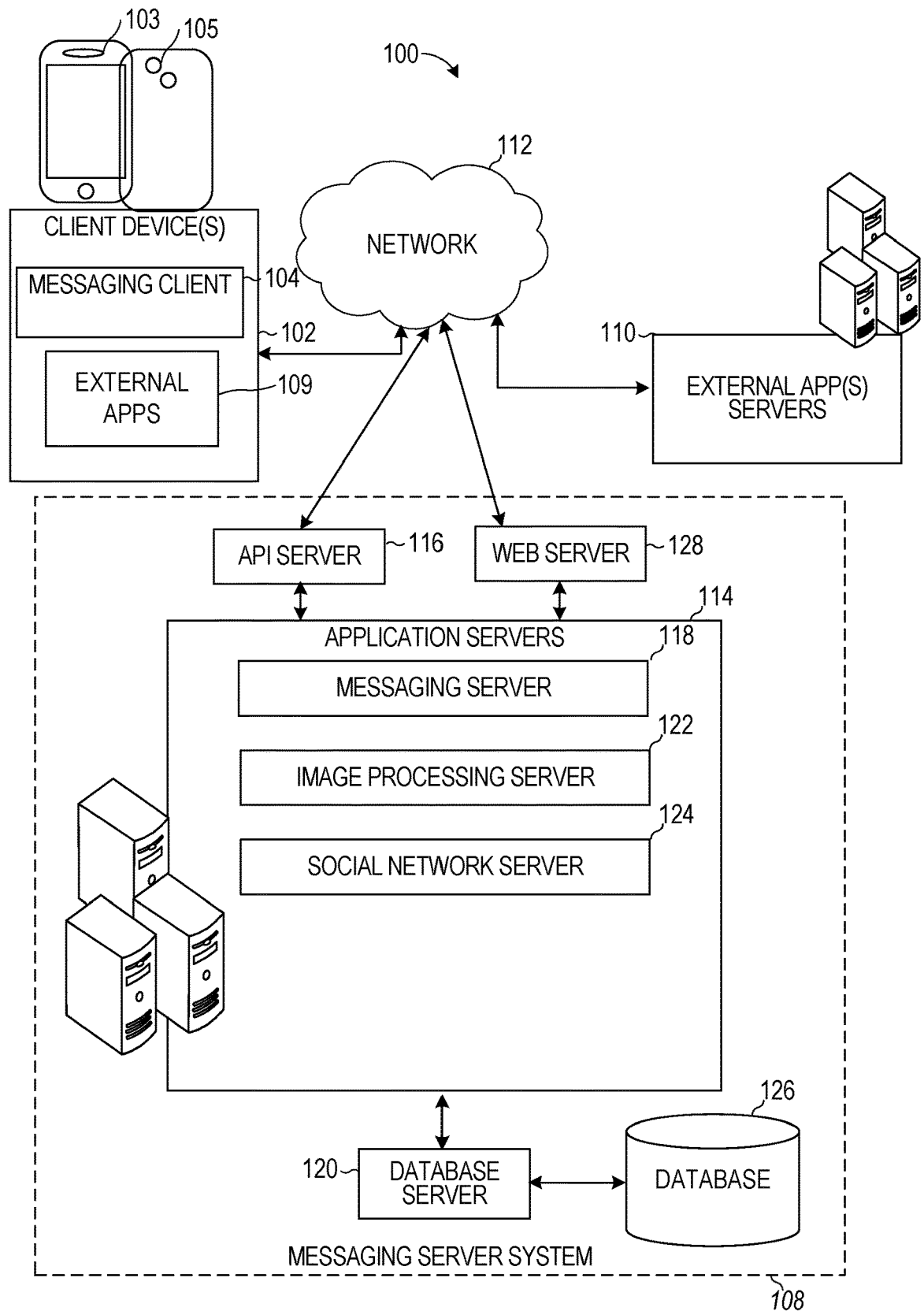
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Messaging applications typically enable end users to access various AR experiences by launching an AR experience bundle or package that includes the AR content associated with the AR experiences. These AR experiences typically present AR elements that can be modified in some manner by the users so that an image captured by a single camera can be modified to include an AR element. Sometimes, these AR experiences are accessed by devices that include multiple cameras, such as a front-facing and rear-facing camera. This enables users to switch cameras that are used as the source of the images being modified. To do so, the users can select a toggle option which activates the front-facing camera instead of the rear-facing camera in case the rear-facing camera was being used to source the images being modified or vice versa.

The activation of these cameras typically takes some time, on the order of a few seconds, which can cause the user to experience some delay in the toggling of the cameras. For example, if the user was modifying images captured by the rear-facing camera and selects the swap option, a blank screen may be temporarily presented (or the screen may freeze) while the rear-facing camera is deactivated and the front-facing camera is activated to source the images. Such delays introduce lag and can disrupt the overall enjoyment of accessing the AR experiences and can waste system resources. Even worse, if a video is being recorded while the cameras are being swapped, a gap in the recorded video can be introduced which can degrade the overall quality of the content being produced.

Also, because typical systems operate the AR experiences with a single camera at a time, precious opportunities to capture content from both cameras can be missed. For example, an AR experience can allow the user to modify an image captured by a rear-facing camera but the user's reaction (which can be detected by the front-facing camera) is a precious opportunity that is missed. In addition, limiting the AR experiences to being generated using one primary camera at a time prevents the AR experiences from being improved based on information that can be gathered by the other camera that is not being used. For example, the other camera can provide valuable information about lighting conditions which can improve the quality of the video or images captured by the primary camera. The lack of using this information also results in poor quality videos being produced which results in missed opportunities and waste of resources.

The disclosed techniques solve these technical issues by enabling developers to create an AR experience that can use images or content captured by multiple cameras (e.g., front and rear-facing cameras) simultaneously. For example, an AR development platform can be provided, which presents a user interface to the AR experience developer to enable the AR developer to activate an option to cause simultaneous activation of multiple cameras (e.g., cameras pointed in opposite directions). The user interface may also enable the developers to specify conditions that need to be met in order to allow for such multiple camera activation to take place. This provides developers a greater amount of flexibility to create useful, interesting and engaging AR experiences without being restricted by the resource constraints of the messaging applications and/or client devices that run the AR experiences.

In some examples, the disclosed techniques detect a real-world object depicted in a first image captured by a first camera of a client device and extract one or more textures from the real-world object depicted in the first image. The disclosed techniques select a target object depicted in a second image captured by a second camera of the client device. The second image can be captured by the second camera simultaneously with the first image captured by the first camera. The disclosed techniques generate an AR element that includes the target object modified based on the one or more textures extracted from the real-world object depicted in the first image and cause display of the AR element within the second image. This improves the overall user experience and reduces the amount of resources consumed by the AR experience.

For example, the disclosed techniques can allow a user to select a configuration or layout of which camera of the first and second cameras is used as the primary camera and which camera is used as the secondary camera. Specifically, a first video stream is captured using a first camera of the client device and a second video stream is captured simultaneously using a second camera of the client device. An AR output is generated by using the first video stream as a primary input to a first AR experience bundle and using the second video stream as a secondary input to the first AR experience bundle. Presentation of the AR output is provided on the client device.

In some embodiments, the disclosed techniques can use information obtained or extracted from the images of the primary camera to perform modifications to images captured and presented by the secondary camera. In this way, a user is provided with the flexibility to apply textures or attributes from a primary camera to a real-world environment depicted in images captured by the secondary camera. In some examples, the texture or AR elements can be added to the images captured by each camera simultaneously. As referred to herein, the term "texture" includes the visual attributes, colors, features, and styles of at least a portion of an underlying image or video.

In some examples, the disclosed techniques provide a seamless and fast way to switch, flip or toggle the primary/secondary images captured and received by the primary and secondary cameras. Because both cameras are active simultaneously, the display presented to the user can quickly swap (modify the configuration of) the images from the two cameras with minimal or no delay at all. This results in an improved way to generate content. In some examples, the disclosed techniques can obtain lighting information from a secondary camera in order to modify display attributes of images obtained and captured by the primary camera or vice versa. This also results in an image or video that has improved quality where the lighting of a room is automatically determined and adjusted for in a captured image or video.

In some examples, the swapping of the cameras (e.g., modifying the configuration of the cameras) only results in modifying the display positions in which the primary/secondary images from the cameras are presented on the display of the device. In some examples, the swapping of the cameras (e.g., modifying the configuration of the cameras) only results in changing which camera is designated as the primary camera and which is designated as the secondary camera. The result of swapping the primary/secondary camera designation (e.g., modifying the configuration of the cameras) results in a change in which image is used to provide the textures and attributes to modify an object depicted in the target image, or which images are used as input to each applied texture. In some examples, the swapping of the cameras (e.g., modifying the configuration of the cameras) results in both modifying the display positions and changing the primary/secondary camera designation. As a result, an end user is provided with greater flexibility in the creation of AR content which can be shared with other users.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109, using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

In some examples, the client device 102 includes a first camera 103 and a second camera 105. The first camera 103 can include one or more cameras that are embedded or included on a display portion of the client device 102. The display portion of the client device 102 can include a touch screen display or other display screen on which content is presented to a user. In some cases, the first camera 103 is referred to as a selfie camera as it usually faces the user. The second camera 105 can include one or more cameras that are embedded or included on an opposite side of the client device 102 than the first camera 103. The opposite side can be the back side of the client device 102. In some cases, the back side of the client device 102 includes a display screen and in other cases the back side of the client device 102 excludes a display screen. The second camera 104 can be referred to as a world camera as this camera is usually facing a real-world environment of a user.

In some examples, the client device 102 can be operated by an AR experience developer. In such cases, the AR experience developer (or AR developer) accesses an AR experience development platform. The AR experience development platform allows the AR developer to generate an AR experience bundle that includes a set of AR elements. The AR developer can select one or more options for enabling simultaneous activation of both the first camera 103 and the second camera 105 of a client device 102 of an end user. As part of enabling the simultaneous activation of both the first camera 103 and the second camera 105 (or multiple cameras), the AR developer can specify parameters of the AR experience. The parameters can include a layout of the images or videos obtained simultaneously from the multiple cameras. The term layout is alternatively referred to as a configuration throughout this description. The layout can specify a display position of the images or videos, such as an image obtained from the first camera 103 being displayed on a top portion of a display screen and an image obtained from the second camera 105 being displayed on a bottom portion of the display. The layout can specify that the image obtained from the first camera 103 is to be displayed on a left portion of a display screen and an image obtained from the second camera 105 is to be displayed on a right portion of the display. The layout can specify that the image obtained from the first camera 103 is to be displayed in full screen and an image obtained from the second camera 105 is to be displayed within or on top of the full screen of the first camera 103 image. The layout can specify that the image obtained from the first camera 103 is to be used as a green screen basis for one or more objects obtained from an image of the second camera 105 to form a single image or video. The layout can specify a face builder layout in which cutouts of facial elements depicted in the image obtained from the first camera 103 are superimposed on top of the image obtained from the second camera 105.

The parameters can include an indication of which of the multiple camera images is to be used as a source image and which is used as a target image for providing an AR experience. For example, the AR developer can specify parameters that indicate a type of real-world object in the target image that is to be modified using one or more textures extracted from a real-world object depicted in the source image. In such cases, the AR experience can detect an object, such as a face, in an image captured by the first camera 103. The AR experience can extract one or more textures from the face (e.g., a texture of the eyes and mouth). The AR experience can detect a real-world object in the target image captured by the second camera 105. The AR experience can generate an AR element using the features of the real-world object and the one or more textures extracted from the face. The AR element can visually represent the face as being included in the real-world object in the target image and the target image is displayed to an end user including the AR element. Namely, the AR element can replace or overlay the real-world object depicted in the target image. As the facial features change in subsequent images captured by the first camera 103 (e.g., the lips of the mouth move), the AR experience continuously updates the AR element to continuously modify the target image captured by the second camera 105. This makes it appear to the user as if the user's face is embedded into the real-world object of the target image that is captured by the second camera 105.

In some examples, the AR developer can specify parameters that indicate a type of AR object (e.g., a 2D or 3D avatar displayed within a real-world environment) in the target image is modified using one or more textures extracted from a real-world object depicted in the source image. In such cases, the AR experience can detect an object, such as a body of a user, in an image captured by the first camera 103. The AR experience can extract one or more textures from the body of the user (e.g., arm positions, torso positions, pose of the body, facial features, and so forth). The AR experience can identify or generate a display of the AR object in the real-world environment depicted in the target image captured by the second camera 105. The AR experience can generate an AR element using the features of the AR object and the one or more textures extracted from the body of the user. The AR experience can modify features of the AR object (e.g., the avatar) to match the textures extracted from the body of the user, such as the arm positions, torso positions, pose of the body, facial features, and so forth. The AR experience can then render a display of the modified AR object within the image captured by the second camera 105. As the features change in subsequent images captured by the first camera 103, the AR experience continuously updates the AR element to continuously modify the target image captured by the second camera 105. This makes it appear to the user as if the user's body is reflected by the AR object that is in real-world environment depicted in the target image that is captured by the second camera 105.

The AR experience developed by the AR developer can be launched on an end user client device 102, such as in response to receiving a user selection of an option to activate simultaneously both the first camera 103 and the second camera 105. In some examples, the option is represented as a camera icon with forward and backward arrows. The AR experience launched by the client device 102 can detect a real-world object depicted in a first image captured by the first camera 103. The client device 102 can extract one or more textures from the real-world object depicted in the first image and select a target object depicted in a second image captured by the second camera 105. The second image is captured by the second camera 105 simultaneously with the first image captured by the first camera 103. The client device 102 can generate an AR element that includes the target object modified based on the one or more textures extracted from the real-world object depicted in the first image and display the AR element within the second image, in some cases together with the first image.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
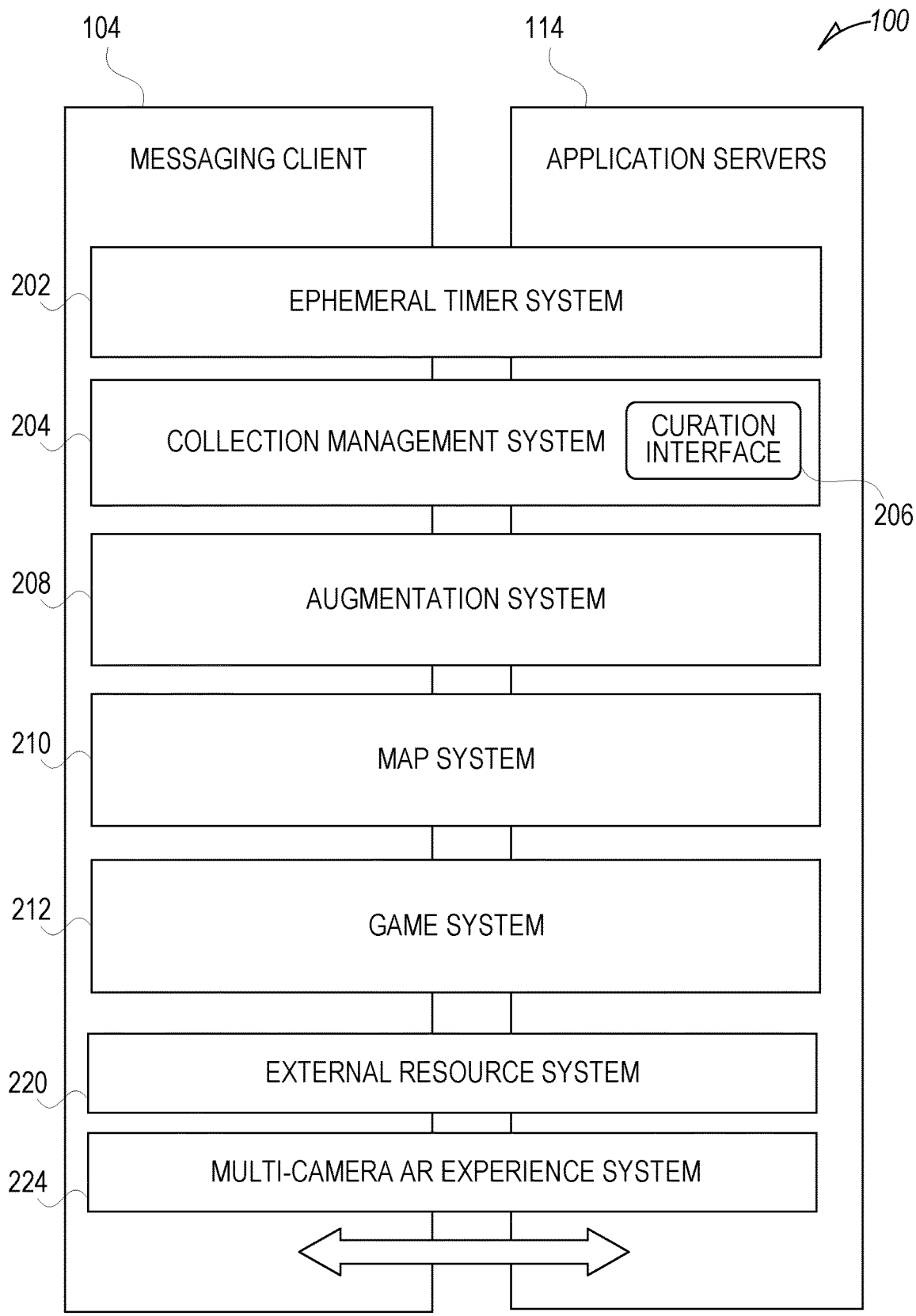
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
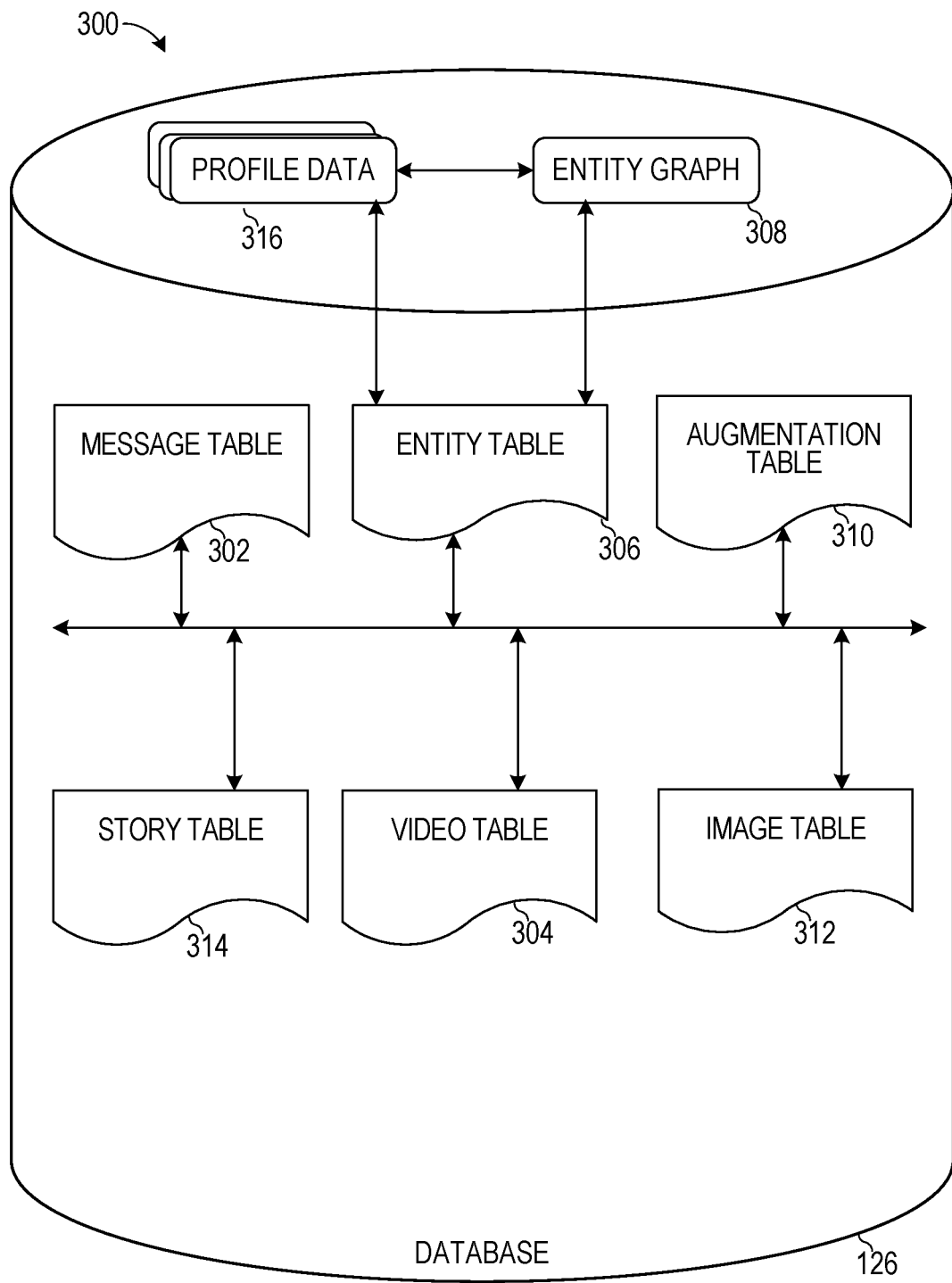
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can allow users to simultaneously activate the first camera 103 and the second camera 105 of the client device 102. The messaging client 104 can present an option to simultaneously activate the first camera 103 and the second camera 105. In response to receiving selection of the option, the messaging client 104 can present a list of different layouts as separate options. The different layouts can include an option to activate a horizontal layout in which in which the first image obtained from the first camera 103 is displayed on a top portion of a screen and the second image obtained from the second camera 105 is displayed on a bottom portion of the screen. The different layouts can include an option to activate a vertical layout in which the first image is displayed on a left portion of the screen and the second image is displayed on a right portion of the screen. The different layouts can include an option to activate a picture-in-picture (PIP) layout in which the first image is displayed in full screen and the second image is displayed within the full screen, the PIP layout enabling a user to reposition the second image within the full screen. The different layouts can include an option to activate a green screen layout in which a portion of the first image is superimposed on a portion of the second image based on one or more object segmentation models. The different layouts can include an option to activate a face builder layout in which cutouts of facial elements depicted in the first image are superimposed on top of the second image.

Depending on which layout is selected, the messaging client 104 activates the first camera 103 and the second camera 105 and generates a display that includes images or representations derived from images obtained or captured by the first camera 103 and the second camera 105. The messaging client 104 can receive input from the user to access an AR experience. In response, the messaging client 104 searches a plurality of AR experiences based on a parameter that indicates simultaneous activation of multiple cameras. The messaging client 104 identifies a subset of the plurality of AR experiences that is configured to perform AR operations using multiple cameras simultaneously. Namely, the messaging client 104 identifies a subset of AR experiences that are associated with the parameter that indicates simultaneous activation of multiple cameras has been enabled for the corresponding AR experience. In this way, the messaging client 104 displays a plurality of icons representing each AR experience that is in the subset and that excludes AR experiences that have not been enabled for simultaneous activation of multiple cameras (e.g., the first camera 103 and the second camera 105).

In some examples, certain AR experiences are developed to utilize multiple cameras simultaneously. This allows the AR experience to automatically activate the multiple cameras simultaneously without receiving a specific user request to activate the multiple cameras or receiving a specific layout request from the user. Namely, in response to receiving selection of an AR experience associated with multiple cameras from the user, multiple cameras are simultaneously activated and their respective outputs are generated for display or configured according to a layout associated with the given AR experience.

The messaging client 104 can receive input from a user that selects a given AR experience using the icons that are displayed representing the subset of AR experiences. In response, the messaging client 104 retrieves configuration information from the given AR experience. The configuration information can specify a layout of the images obtained from the multiple cameras. The messaging client 104 presents the images obtained from the first camera 103 and the second camera 105 simultaneously according to the layout of the configuration information. The messaging client 104 can present a prompt or message informing the user that both the first camera 103 and the second camera 105 have been activated.

In some examples, the messaging client 104 presents a flip option or swap option. In response to receiving a user selection of the flip option or swap option, the messaging client 104 reconfigures the layout of the images obtained from the first camera 103 and the second camera 105. For example, the messaging client 104 can modify the positions of images captured by the first camera 103 and the second camera 105 within a display or a source image from which the one or more textures are extracted. As an example, the messaging client 104 can initially display images captured by the first camera 103 at a first position on the display and images captured by the second camera 105 at a second position on the display. In response to receiving the selection of the flip option or swap option, the messaging client 104 selects a new real-world object depicted in the second image and extracts a set of textures from the new real-world object. The messaging client 104 modifies one or more objects depicted in the first image instead of modifying the target object in the second image based on the set of textures extracted from the new real-world object. The messaging client 104 can also, or in the alternative, modify the positioning of images such that the second image is presented in the first position and the first image is presented in the second position in response to receiving the selection of the flip option or swap option. As another example, the messaging client 104 can display the first image in a first position on the display and the second image in a second position on the display and, in response to receiving the selection of the flip or swap option, can position the second image in the first position and the first image in the second position.

In some examples, the messaging client 104 can present an AR developer interface. In such cases, the messaging client 104 can be operated by an AR developer to develop and create one or more AR experiences, as discussed below. The AR developer interface enables a developer to specify whether a given AR experience is enabled for simultaneous activation of multiple cameras. The AR developer can select one or more options for enabling simultaneous activation of both the first camera 103 and the second camera 105 of a client device 102 of an end user by specifying parameters of the AR experience. The parameters can include a layout of the images or videos obtained simultaneously from the multiple cameras.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 sync up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The multi-camera AR experience system 224 can allow users to access an AR experience for which simultaneous activation of multiple cameras have been enabled and/or to select an option to independently activate the first camera 103 and the second camera 105 of the client device 102 simultaneously. In response to receiving selection of the option and/or the AR experience, the multi-camera AR experience system 224 can present a list of different layouts as separate options. The multi-camera AR experience system 224 generates a display that includes images or representations derived from images obtained or captured by the first camera 103 and the second camera 105. The multi-camera AR experience system 224 retrieves configuration information from a given AR experience and presents the images obtained from the first camera 103 and the second camera 105 simultaneously according to the layout of the configuration information. The multi-camera AR experience system 224 can present a prompt or message informing the user that both the first camera 103 and the second camera 105 have been activated. The multi-camera AR experience system 224 can present a flip or swap option to change the layout or configuration of the images obtained from the first camera 103 and the second camera 105 instantaneously and without delay.

The multi-camera AR experience system 224 can allow AR developers to create AR experiences with AR elements or assets that use multiple cameras simultaneously. The AR elements can include any combination of a 3D mesh object, a two-dimensional (2D) mesh, a machine learning model, a graphical element, an avatar, a sound, or a video. The multi-camera AR experience system 224 can present a user interface of an AR developer platform. The user interface can be used to select whether or not simultaneous activation of multiple cameras is enabled for a given AR experience and to specify one or more parameters for such simultaneous activation of the multiple cameras including a layout. The graphical user interface presents a list of AR experiences and includes a first option associated with a first AR experience to enable simultaneous activation of multiple cameras for the first AR experience. The graphical user interface can include an option to specify one or more parameters for the simultaneous activation of the multiple cameras of the first AR experience.

This provides a greater amount of flexibility for a developer to create useful, interesting and engaging AR experiences without being restricted by the resource constraints of the messaging applications and/or client devices that run the AR experiences.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
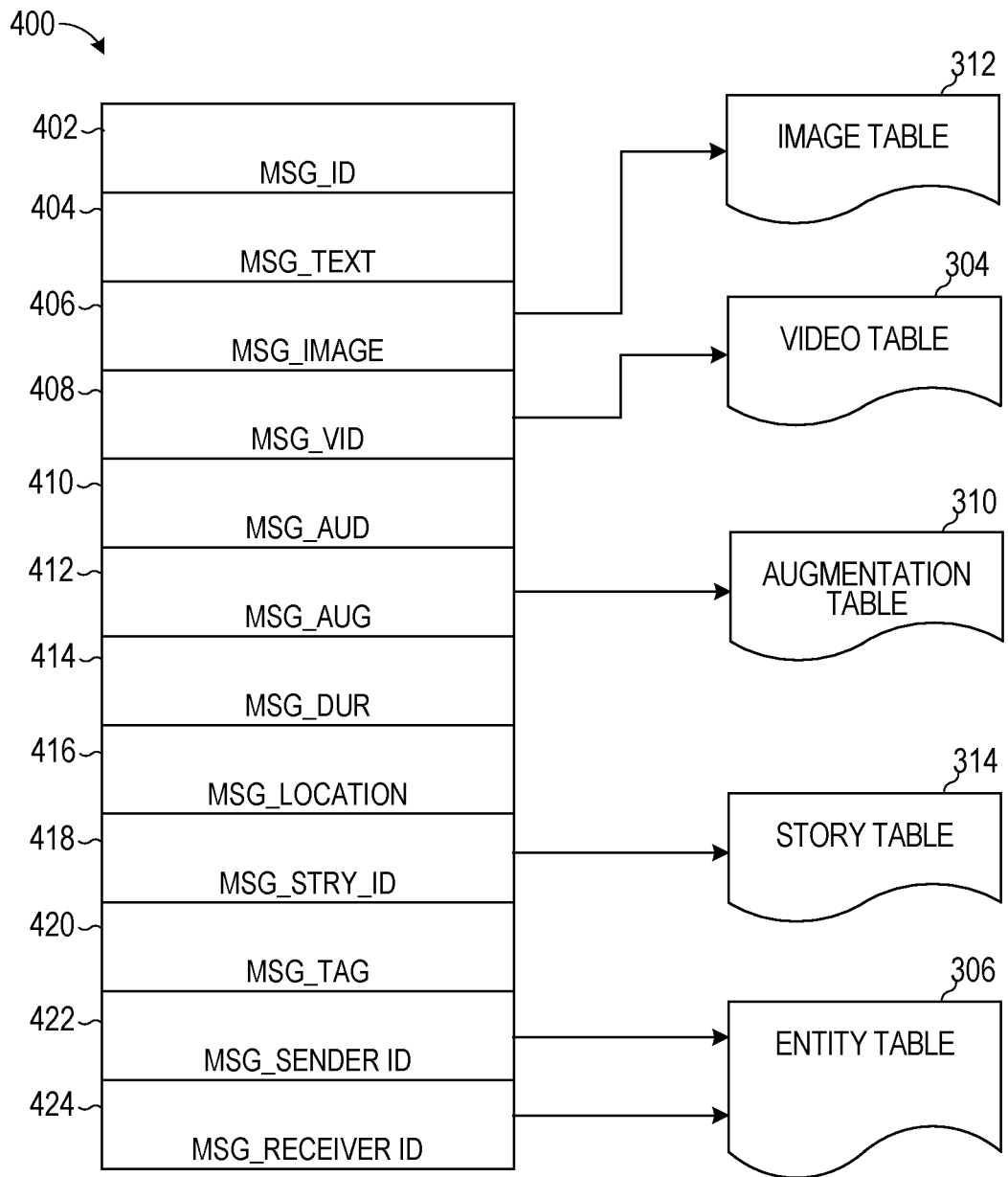
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Multi-Camera AR Experience System

Figure 5:
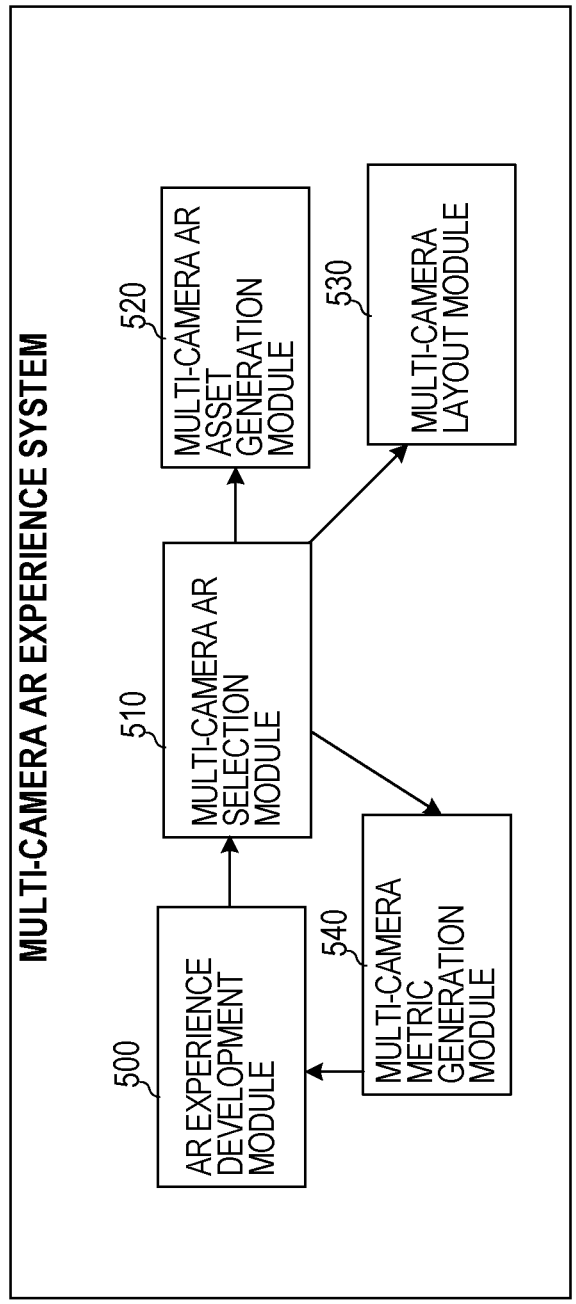
FIG. 5 is a block diagram showing an example multi-camera AR experience system, according to some examples.

FIG. 5 is a block diagram showing an example multi-camera AR experience system 224, according to some examples. The multi-camera AR experience system 224 includes an AR experience development module 500, a multi-camera AR selection module 510, a multi-camera AR asset generation module 520, a multi-camera layout module 530, and a multi-camera metric generation module 540.

The AR experience development module 500 can generate user interfaces for presentation to an AR developer on an AR developer client device 102. The user interfaces can enable the AR developer to enable simultaneous activation of multiple cameras for respective AR experiences. The user interfaces can enable the AR developer to select an AR experience bundle. In response, the user interface can present a prompt with one or more options for enabling simultaneous activation of multiple cameras (e.g., a front and back camera) when the AR experience is launched on a client device 102. The prompt can also enable the AR developer to specify one or more parameters for the simultaneous activation of multiple cameras.

As referred to herein, an "AR experience bundle" or "AR bundle" represents a set of AR elements (including standard AR elements and linked AR elements) and corresponding configuration data and code that indicates the visual appearance, interaction and behavior of each of the AR elements. The AR bundle includes the code necessary for a client device 102 to launch and execute the AR experience associated with the AR bundle. The configuration data can specify whether the AR experience is associated with a parameter that enables simultaneous activation of multiple cameras, the layout or configuration of images obtained from the multiple cameras (e.g., the first camera 103 and the second camera 105), the filters or visual effects to be applied to the images obtained from each camera, and/or which image is used as a source image (e.g., which camera is the primary camera that provides the source image) and which is used as a target image (e.g., which camera is the secondary camera that provides the target image) in generating and presenting an AR element.

In some examples, the AR experience development module 500 receives a request from a developer client device 102 to access a developer user interface. The AR experience development module 500 can receive login credentials from the developer client device 102. The AR experience development module 500 can search for an account associated with the login credentials and can generate a graphical user interface associated with the account for presentation to the developer client device 102. The AR experience development module 500 can present in the graphical user interface a plurality of AR experience bundles associated with the account. In some cases, the account is accessible to an organization, in which case multiple users within the organization can share access to the account and can view the same set of AR experience bundles.

Figure 6:
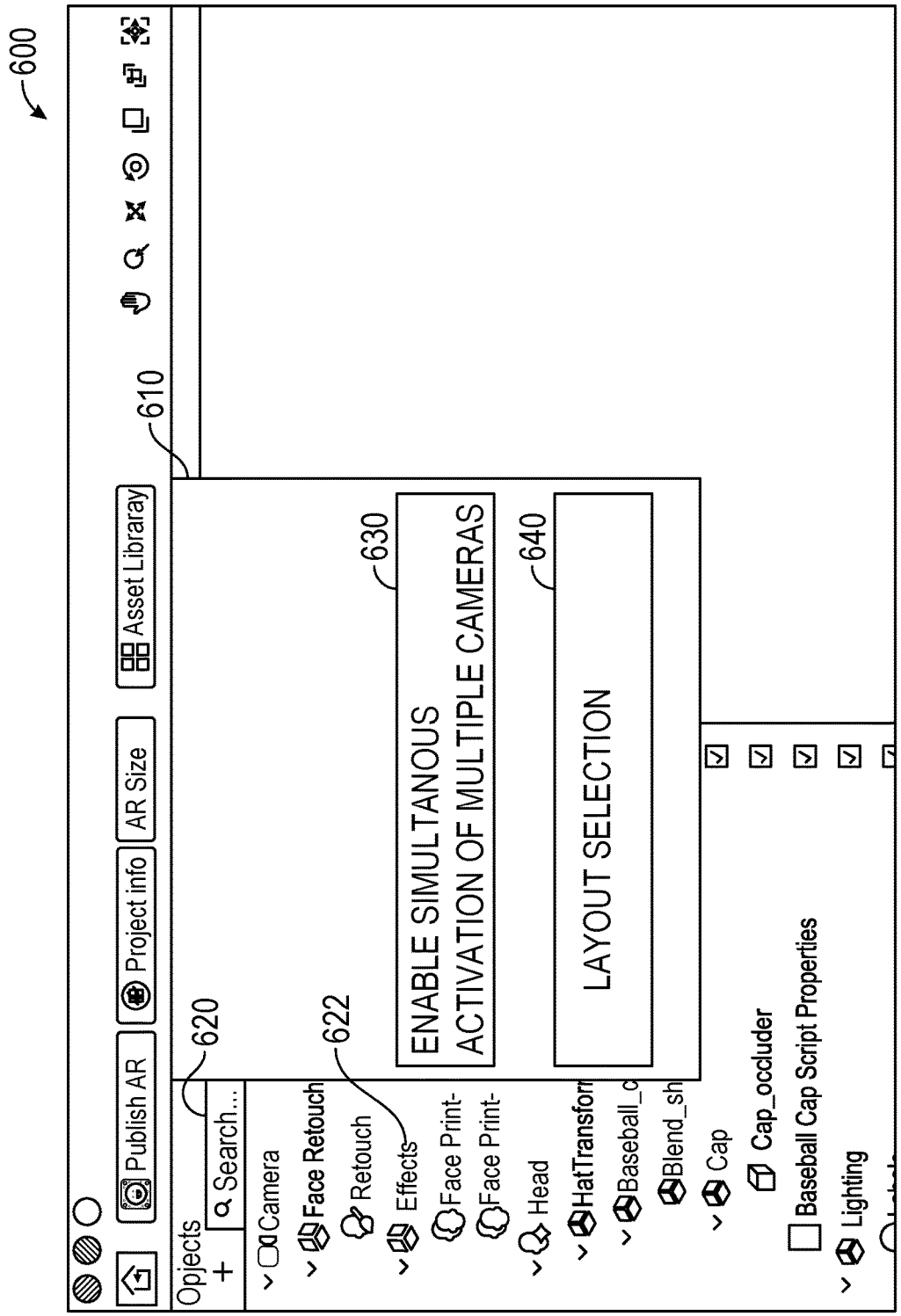
FIGS. 6, 7, 8A, 8B and 8C are diagrammatic representations of outputs of the multi-camera AR experience system, in accordance with some examples.

The AR experience development module 500 can receive input from the developer client device 102 that selects a given AR experience bundle. In response to receiving the input, the AR experience development module 500 can present a graphical user interface 600 (FIG. 6). The AR experience development module 500 can include in the graphical user interface 600 an identifier of the AR experience bundle and a list of AR objects or AR elements 620 that are included in the AR experience bundle. The AR elements can include 2D meshes, 3D meshes, videos, audio files, image files, avatars, graphical elements, and/or machine learning models. The AR experience development module 500 can receive input that selects a given AR element 622 of the AR objects or AR elements 620, such as an effects element.

In response, the AR experience development module 500 presents a prompt 610 that lists options enabling simultaneous activation of multiple cameras on an end user client device 102. For example, the prompt 610 can include an enable simultaneous activation of multiple cameras option 630. In response to receiving a selection of the option 630, the AR experience development module 500 updates configuration data for the given AR experience bundle to indicate that simultaneous activation of multiple cameras has been enabled. The prompt 610 can also include a layout or configuration selection option 640. In response to receiving selection of the option 640, the AR experience development module 500 updates the configuration data to indicate the selected layout for the given AR experience.

In some examples, in response to receiving the selection of option 640, a list of different layouts or configurations can be presented to the AR developer. For example, the list of different layouts can include a first layout option. In response to selecting the first layout option, instructions are stored for routing and displaying the images or videos obtained from the multiple cameras. For example, the AR experience bundle can control image inputs such that an image (e.g., a primary image) obtained from the one camera (e.g., the first camera 103 or the primary camera) is to be routed to and displayed on a top portion (e.g., a top half or top quarter) of a display screen and an image (e.g., secondary image) obtained from another camera (e.g., the second camera 105 or the secondary camera) is routed to and displayed on a bottom portion (e.g., a bottom half or bottom quarter or ¾ of the bottom) of the display. As another example, a second layout option can be included in the list of layouts which, when selected, stores AR experience bundle instructions for routing and displaying the image (e.g., primary image) obtained from one camera (e.g., the first camera 103 or the primary camera) on a left portion (e.g., the left half or left quarter) of a display screen and an image (e.g., a secondary image) obtained from another camera (e.g., the second camera 105 or the secondary camera) on a right portion (e.g., a right half or right quarter or ¾ of the right) of the display. Alternatively, the images can be controlled (by the AR experience bundle) such that an image (e.g., primary image) obtained from the second camera 105 is to be routed to and displayed on a top portion (e.g., a top half or top quarter) of a display screen and an image (e.g., secondary image) obtained from the first camera 103 is routed to and displayed on a bottom portion (e.g., a bottom half or bottom quarter or ¾ of the bottom) of the display.

The list of different layouts can include a third layout option. In response to selecting the third layout option, instructions are stored for routing and displaying the image (e.g., primary image) obtained from one camera (e.g., the first camera 103 or the primary camera) in full screen and an image (e.g., secondary image) obtained from another camera (e.g., the second camera 105 or the secondary camera) within or on top of the full screen image. This can be referred to as a PIP layout. Alternatively, instructions can be stored for routing and displaying the image (e.g., primary image) obtained from the second camera 105) in full screen and an image (e.g., secondary image) obtained from the first camera 103 within or on top of the full screen image.

The list of different layouts can include a fourth layout option. In response to receiving a selection of the fourth layout option, instructions can be stored for routing and using the image (e.g., primary image) obtained from one camera (e.g., the second camera 105 or the secondary camera) as a green screen basis for one or more objects obtained from an image (e.g., secondary image) of another camera (e.g., the first camera 103 or the primary camera) to form a single image or video. In such circumstances, the image (e.g., secondary image) obtained from the second camera 105 (e.g., the secondary camera) is processed by the AR experience bundle to identify a background and a foreground. The foreground can be removed on a pixel-by-pixel basis. The background can then be used as a green screen. The primary image obtained from the first camera 103 or the primary camera can be processed by the AR experience bundle similarly to identify the background and foreground. In some examples, a real-world object, such as a person can be identified and used as the foreground of the image obtained from the first camera 103. The foreground of the image from the first camera 103 (the primary camera) can then be overlaid on the background of the image obtained from the second camera 105 to generate a new image. The new image can then be displayed in a separate portion of the display (e.g., together with images obtained from the first camera 103 and the second camera 105) or in place of one of the images obtained from the first camera 103 and the second camera 105.

The list of different layouts can include a fifth layout option. In response to receiving a selection of the fifth layout option, instructions can be stored for providing a face builder layout in which cutouts of object segmentations (e.g., facial elements) depicted in the image (e.g., primary image) obtained from the first camera 103 (e.g., the primary camera) are superimposed on top of the image (e.g., secondary image) obtained from the second camera 105 or vice versa. For example, the fifth layout option can include a selection of one or more object segmentation models. The object segmentation models can include a face segmentation model, a body segmentation model, an animal segmentation model, a body part segmentation model, and so forth. Input from an AR developer can be received that selects one or more of the object segmentation models. Using the selected object segmentation model, a source image (e.g., an image obtained from one camera, such as the first camera 103 or the primary camera) is processed to segment one or more objects using the object segmentation model (e.g., a face segmentation model). The segmentation is used to extract one or more features from the segmented portions of the image. The segmented portions and extracted features are then overlaid and incorporated into a real-world or AR object depicted in a target image (e.g., an image obtained from another camera, such as the second camera 105 or the secondary camera).

The multi-camera AR selection module 510 can receive the configuration data from the AR experience development module 500. The multi-camera AR selection module 510 can present options on an end user client device 102 to generate AR experiences using multiple cameras simultaneously. For example, the multi-camera AR selection module 510 can present an icon or option to enable or active multiple cameras of the client device 102. The icon can visually depict a camera with forward and backward arrows. In response to receiving a selection of the option, the multi-camera AR selection module 510 can present a list of different layouts for the user to choose from. As different layouts are selected, an updated AR output is generated by the AR experience bundle by modifying and/or altering layouts of the video stream inputs that are received from the multiple cameras simultaneously.

In some examples, the multi-camera AR selection module 510 receives a request from the user to access a list of AR experiences. In response, the multi-camera AR selection module 510 can search a plurality of AR experiences (e.g., configuration data associated with the plurality of AR experiences) to identify a subset of AR experiences for which the simultaneous activation of multiple cameras has been enabled. The multi-camera AR selection module 510 can generate a list of icons that each represents a corresponding one of the AR experiences for which the simultaneous activation of multiple cameras has been enabled. The multi-camera AR selection module 510 can receive input that selects a given AR experience from the list.

The multi-camera AR selection module 510 retrieves configuration data for the given AR experience that has been selected. The multi-camera AR selection module 510 also automatically activates both the first camera 103 and the second camera 105 if the two cameras have not previously been activated. The multi-camera AR selection module 510 can obtain a layout or configuration for the given AR experience from the configuration data. For example, the configuration data can specify that the layout or configuration for the given AR experience is associated with a face builder layout. In such cases, the multi-camera AR selection module 510 obtains an object segmentation model (e.g., a face segmentation model) specified by the configuration data. The multi-camera AR selection module 510 applies the object segmentation model to a first image obtained from the first camera 103 (e.g., video captured by the primary camera) to extract one or more features of the object corresponding to the object segmentation model. The multi-camera AR selection module 510 then identifies a target object (e.g., a real-world object or AR object) in a second image obtained from the second camera 105 (e.g., video captured by the secondary camera). The target object can be specified by the user, such as by tapping on the object that is presented to the user on the display of the client device 102. The target object can be specified by an object type in the configuration data of the AR experience. In such cases, the multi-camera AR selection module 510 applies an object classifier to the second image to classify the objects depicted in the second image and to search for the object that matches the object type specified in the configuration data. As referred to herein, a primary camera can provide a primary input to an AR experience bundle and a secondary camera can provide a secondary input to the same AR experience bundle to generate an AR output.

The multi-camera AR selection module 510 can then provide the one or more features of the object corresponding to the object segmentation model and the target object to the multi-camera AR asset generation module 520. The multi-camera AR asset generation module 520 can modify the target object using the one or more features of the object corresponding to the object segmentation model. For example, the multi-camera AR asset generation module 520 can generate an AR output by using the first video stream received from the primary camera as input to a corresponding AR experience bundle and using the second video stream as a secondary input to the AR experience bundle. The AR output can include an AR element that includes some visual properties of the target object (of the second image received from the secondary input as the second video stream from the secondary camera) and some visual properties of the one or more features of the object (from the first image or the primary input received from the primary camera) corresponding to the object segmentation model. The multi-camera AR asset generation module 520, for example, overlays the features of the object from the first image onto the target object from the second image. The multi-camera AR asset generation module 520 then incorporates the generated AR object into the first or second images.

Figure 7:
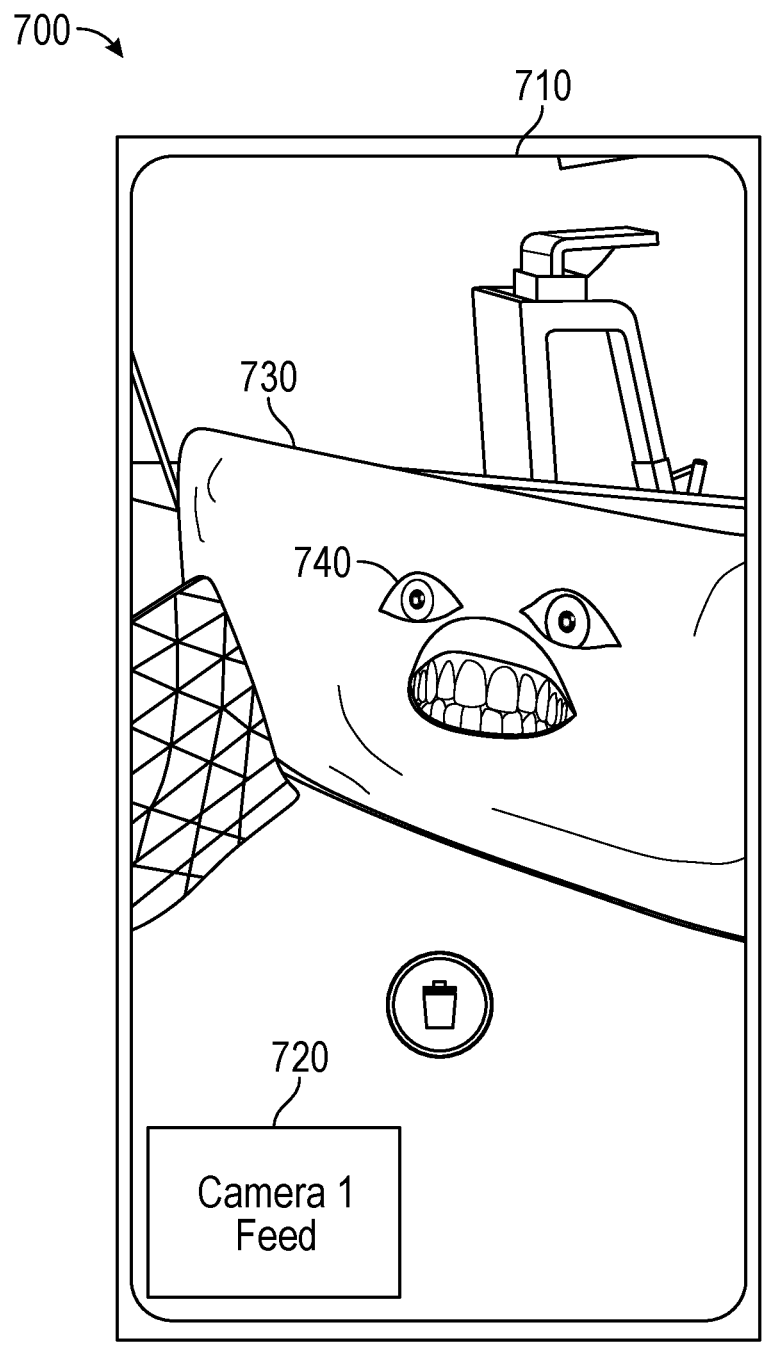

For example, as shown in FIG. 7. the client device 102 can present a user interface 700 corresponding to or generated by a given AR experience associated with simultaneous activation of multiple cameras. The user interface 700 can include a message (not shown) indicating that both the first camera 103 and the second camera 105 are simultaneously activated. The user interface 700 includes a first image 720 captured or received by the first camera 103 of the client device 102. The first image 720 can depict a real-world object, such as a human face. The user interface 700 simultaneously presents a second image 710 captured or received by the second camera 105 of the client device 102. The second image 710 can depict a real-world environment which includes a target real-world object 730. The first image 720 and the second image 710 can be displayed according to the configuration data of the given AR experience, such as in a PIP display layout, a horizontal display layout, or a vertical display layout.

The client device 102 can access configuration data to extract one or more features of the real-world object depicted in the first image 720. For example, the client device 102 can extract eyes and mouth from the human face depicted in the first image 720. The client device 102 can then overlay features of the eyes and mouth 740 onto the target real-world object 730 depicted in the second image 710. As the eyes and mouth features change or move in subsequent images captured by the first camera 103, the client device 102 continuously updates the features of the eyes and mouth 740 that are overlaid onto subsequent images captured by the second camera 105 that depict the target real-world object 730. The client device 102 can receive input that selects a record option. In response, the client device 102 can record a video (of a specified duration) that represents the movement of the features of the eyes and mouth 740 that are overlaid onto subsequent images captured by the second camera 105 that depict the target real-world object 730. The recorded video can be shared with one or more other users.

The client device 102 can receive input that selects an alternate target object that is depicted in images captured by the second camera 105. The input can be received by tapping a region of the screen at which the alternate target object is displayed. In response, the client device 102 can move the eyes and mouth features from being overlayed on the target real-world object 730 to being overlaid on the alternate target object. The client device 102 can allow the user to rotate, scale, and/or place the features of the eyes and mouth 740 at any user selected point within the second image 710.

In some examples, the client device 102 can receive a request to swap the images, by selecting an on-screen swap option. In response, the client device 102 can change the display layouts or configuration of the first image 720 and the second image 710. Namely, the client device 102 can swap which camera is used as the primary camera to provide a primary input to the AR experience bundle for generating an AR output and which is used as a secondary camera to provide a secondary input to the AR experience bundle. The client device can then generate an updated AR output by using the second video stream as the primary input to the AR experience bundle and using the first video stream as the secondary input to the AR experience bundle. For example, the client device 102 can display the second image 710 with the modified target object in the region of the display where the first image 720 was displayed and can display the first image 720 in the region of the display where the second image 710 was displayed. In some examples, in addition to or alternative to swapping the display positions, in response to receiving the selection of the swap option, the client device 102 can apply a segmentation model to extract one or more features of a given object depicted in the second image 710 and modify another target object depicted in the first image 720 using the extracted features. Namely, the client device 102 can replace which camera image is used as the source image (e.g., the primary input to the AR experience bundle) (for extracting features of an object) and which camera image is used as the target image (e.g., the secondary input to the AR experience bundle) (for embedding or modifying an object using the extracted features of the source image) in response to receiving selection of the swap option.

In some examples, the client device 102, prior to activating the first camera 103 and the second camera 105 simultaneously, the client device 102 can determine whether either of the cameras is currently activated. For example, the client device 102 can determine that the first camera 103 is currently active and being used to display an image when a request to activate both cameras simultaneously is received (such as by selecting a given AR experience or selecting a dedicated multi-camera activation option). The client device 102 can store an indication that the first camera 103 was active and then can activate both cameras 103 and 105 in response to the request. The client device 102 can receive a request to stop the simultaneous activation of the first camera 103 and the second camera 105, such as by selecting an exit option, de-selecting the dedicated multi-camera activation option, selecting a different AR experience for which the simultaneous activation of multiple cameras is disabled, and/or closing out of the AR experience. In response, the client device 102 can access a previously stored indication of which camera was previously activated and can maintain that camera in the active state. For example, the client device 102 can in response to receiving the request to stop the simultaneous activation, can deactivate the second camera 105 while maintaining active the first camera 103 because of the stored indication that the first camera 103 was active prior to receiving the request to activate both cameras simultaneously.

In some examples, the client device 102 can receive a request to call or engage in a video call with another client device 102. This can be performed while the first and second cameras 103 and 105 are simultaneously activated. During the video call, images from both the first and second cameras 103 and 105 can be simultaneously sent to the recipient client device 102 according to one of the layouts selected by the user.

In some examples, the client device 102 can use the first and second cameras 103 and 105 to assist the user in a shopping AR experience to see how different AR objects look on different portions of the user's body depicted in different images captured respectively by the first and second cameras 103 and 105. For example, the client device 102 can receive input that selects a shopping AR experience. In response, the shopping AR experience is launched and informs the user to position a first body part (e.g., a head) within view of the first camera 103 and to position a second body part (e.g., feet) within view of the second camera 105. The client device 102 can receive a first image that is captured by the first camera 103 and that depicts the first body part and can receive a second image that is captured by the second camera 105 and that depicts the second body part. The first image can be provided as a primary input to the shopping AR experience bundle and the second image can be used as a secondary input to the shopping AR experience bundle.

The client device 102 can segment the first and second body parts using respective body segmentation model types. The client device 102 can then select AR objects corresponding to each body part. For example, the client device 102 can select a hat or glasses AR object for the first body part that can be a head and can select a shoes or pants AR object for the second body part that can be feet. In some examples, the client device 102 can render a display of the hat or glasses AR object on top a portion of the image obtained from the first camera 103 that depicts the first body part and simultaneously render a display of the shoes or pants AR object on top of a portion of the image obtained from the second camera 105 that depicts the second body part. In some examples, the client device 102 displays the two images separately. In some examples, the client device 102 generates a combined image that depicts the two portions of the users body with the corresponding AR objects together and displays the combined image to the user. In this way, the client device 102 can use the AR shopping experience bundle to apply a first AR effect to the primary input (e.g., the first image captured by the first camera 103) and a second AR effect to the secondary input (e.g., the second image captured by the second camera 105).

Referring back to FIG. 5, the multi-camera metric generation module 540 can track usage of the multiple cameras on various client devices 102 for one or more AR experiences. The multi-camera metric generation module 540 can generate statistics or metrics representing such usage and present the metrics to the AR developer. For example, the multi-camera metric generation module 540 can count the number of times that each client device activates simultaneously the first camera 103 and the second camera 105. The multi-camera metric generation module 540 can count the number of client devices 102 that are capable of activating multiple cameras simultaneously. The multi-camera metric generation module 540 can count the number of times failures and the number of times successes occurred in activating multiple cameras simultaneously on respective client devices 102.

Figure 8A:
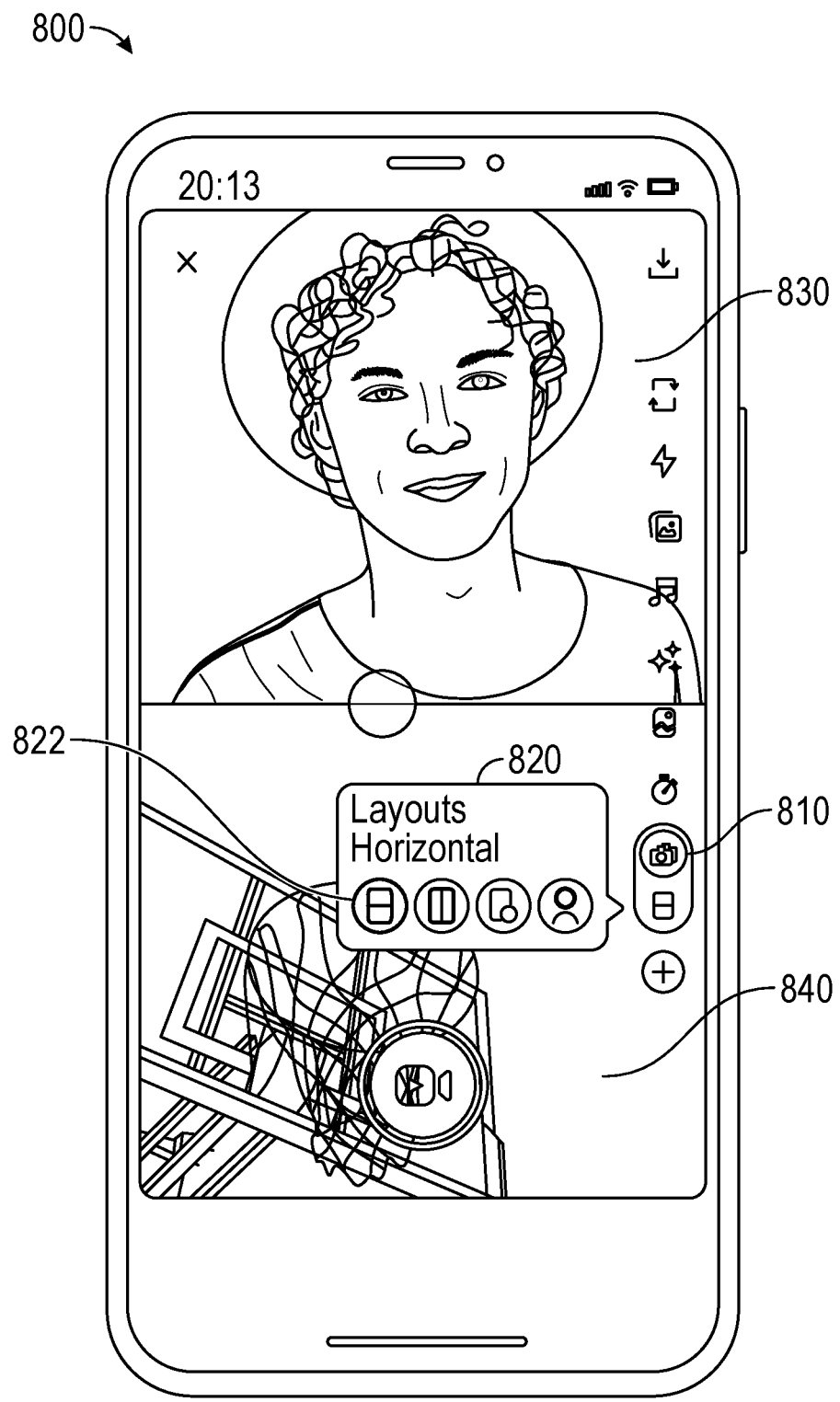

The multi-camera layout module 530 enables a user to activate multiple cameras simultaneously and modify the layout or configuration of the images obtained from the first camera 103 and the second camera 105. The multiple cameras can be active at the same time prior to receiving the user request or ca both be disabled when the user request is received. For example, the multi-camera layout module 530 can present a set of options for selecting a given layout or configuration. The set of options can be presented while at least one of the first camera 103 and the second camera 105 is not capturing video. In response to receiving selection of one of the options, the layout or configuration of the images received from respective cameras are switched after activating both cameras simultaneously (if both cameras were not active when the request was received). Specifically, as shown in FIG. 8A, a user interface 800 is presented that includes a menu of options on the client device 102. The menu includes a multiple camera activation option 810. In response to receiving input that selects the multiple camera activation option 810, the client device 102 can present a menu 820 with a list of layout options 822. The list of layout options 822 can include a vertical layout option, a horizontal layout option, a PIP layout option, and a face builder layout option. The option 810 can be presented while at least one of the first camera 103 and the second camera 105 is not capturing video or while both cameras are capturing videos.

Figure 8B:
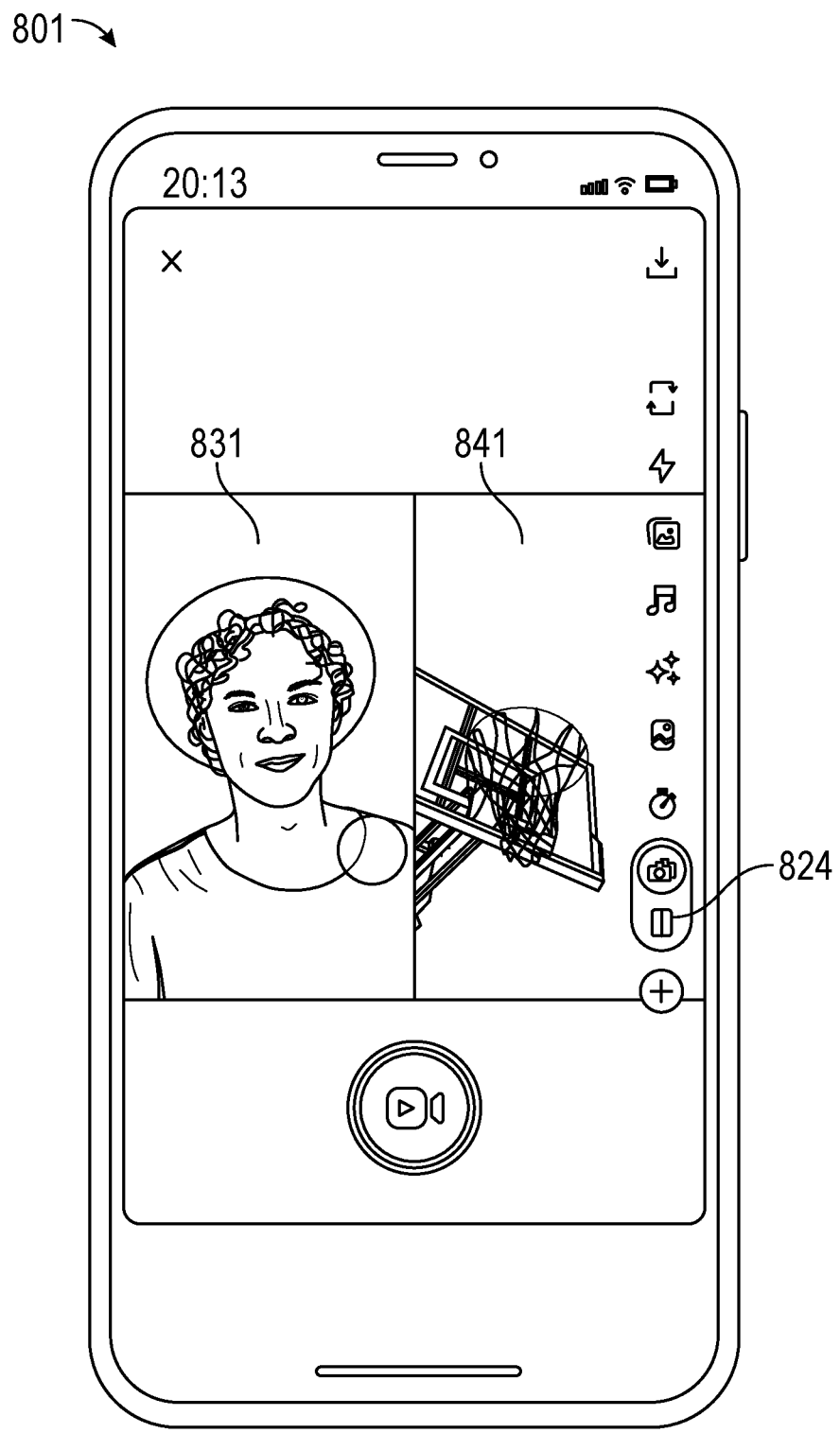
Figure 8C:
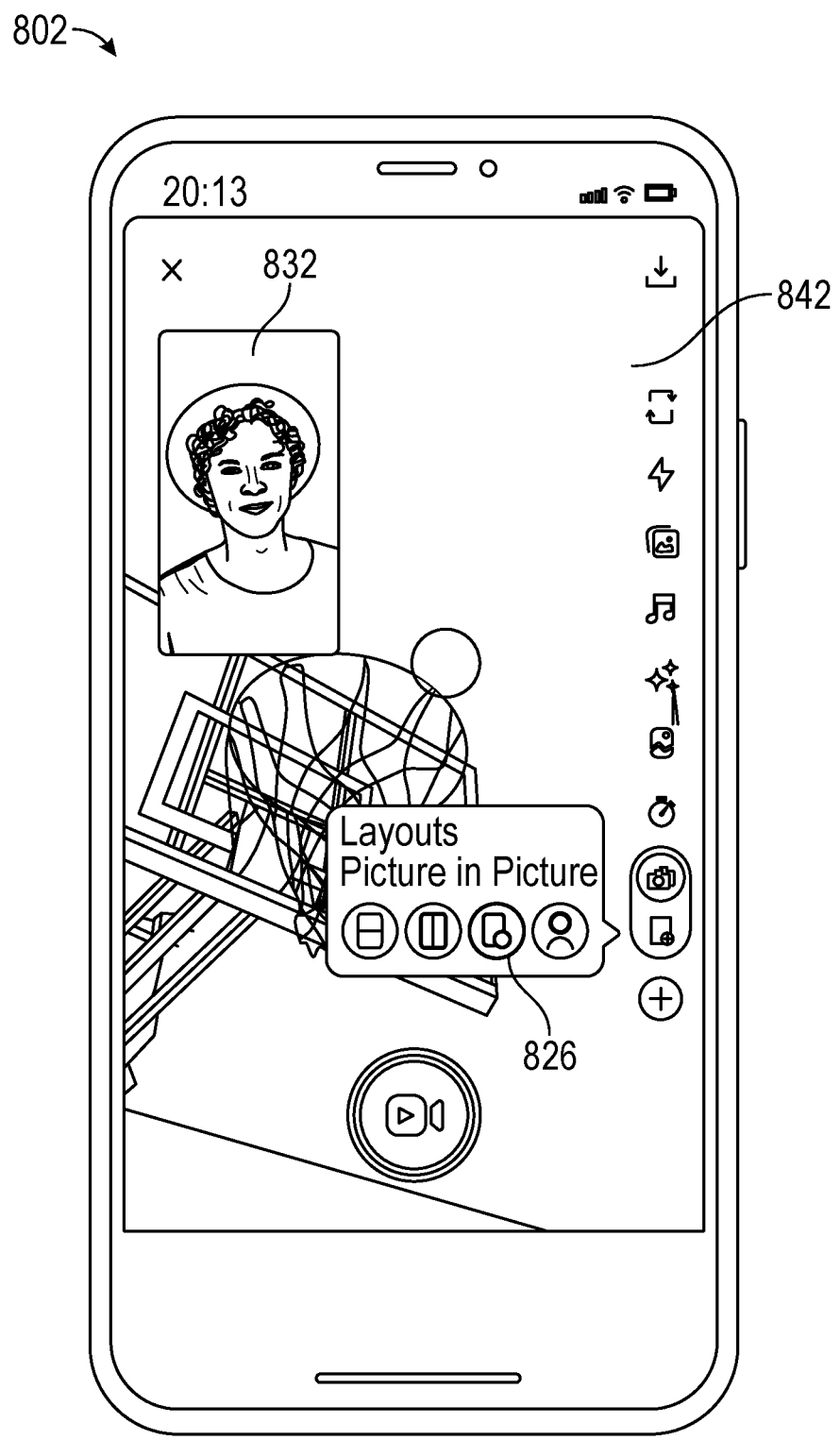

In response to receiving input that selects the horizontal layout option, the client device 102 activates the two cameras (if not already active) and presents a first image 830 received from the first camera 103 on a top portion of the screen and a second image 840 received from the second camera 105 on a bottom portion of the screen. As shown in FIG. 8B, in response to receiving input that selects the vertical layout option, the client device 102 presents a user interface 801 in which a first image 831 received from the first camera 103 is displayed on a left portion of the screen and a second image 841 received from the second camera 105 is displayed on a right portion of the screen. The client device 102 can include an indicator 824 of the layout that has been selected together with the images that are displayed. As shown in FIG. 8C, in response to receiving input that selects the PIP layout option, the client device 102 presents a user interface 802 in which a first image 832 received from the first camera 103 is displayed in a window on top of a full screen display of a second image 842 received from the second camera 105. The client device 102 can include an indicator 826 of the layout that has been selected together with the images that are displayed.

Figure 9A:
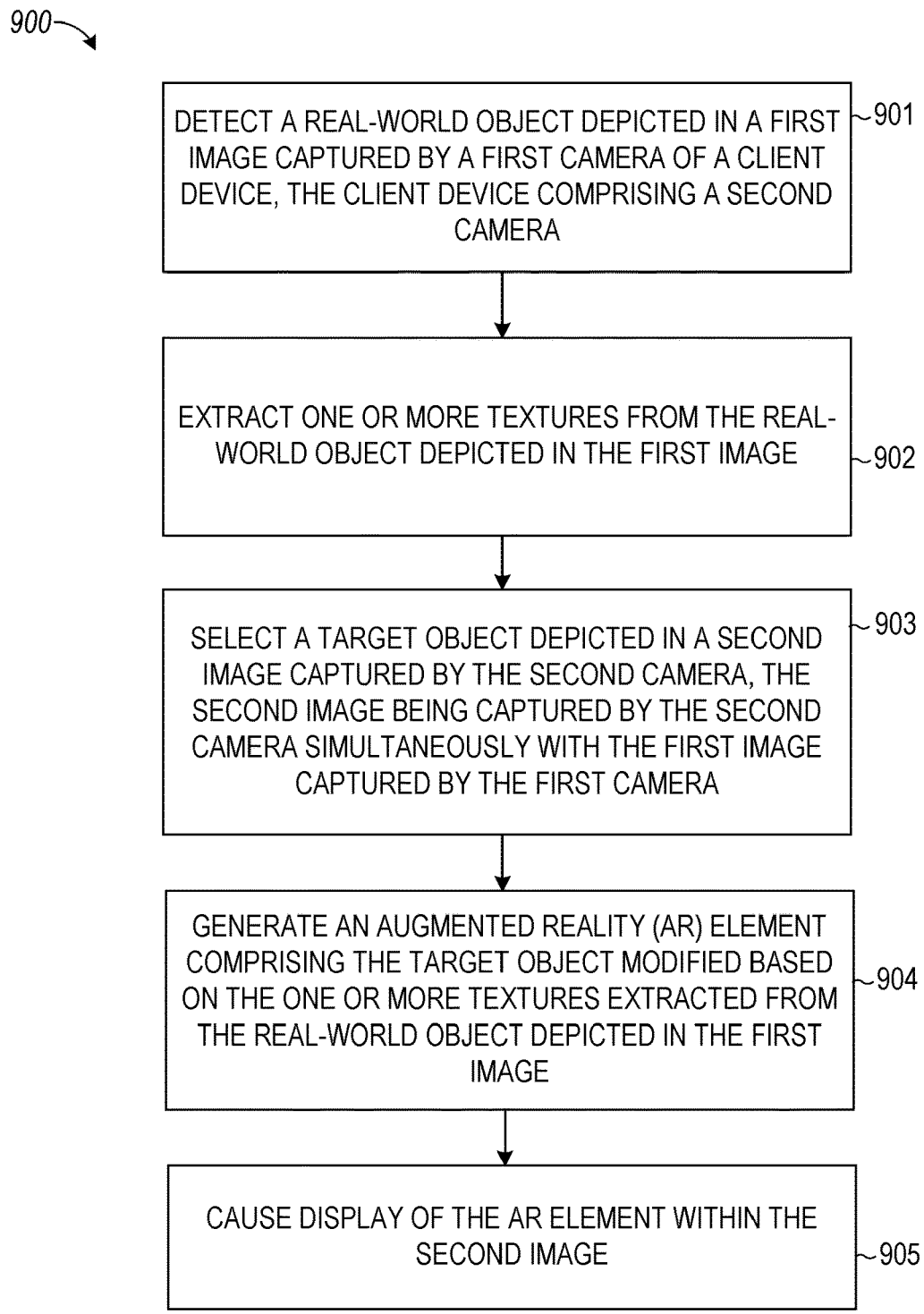
FIGS. 9A and 9B are flowcharts illustrating example operations of the multi-camera AR experience system, according to some examples.
Figure 9B:
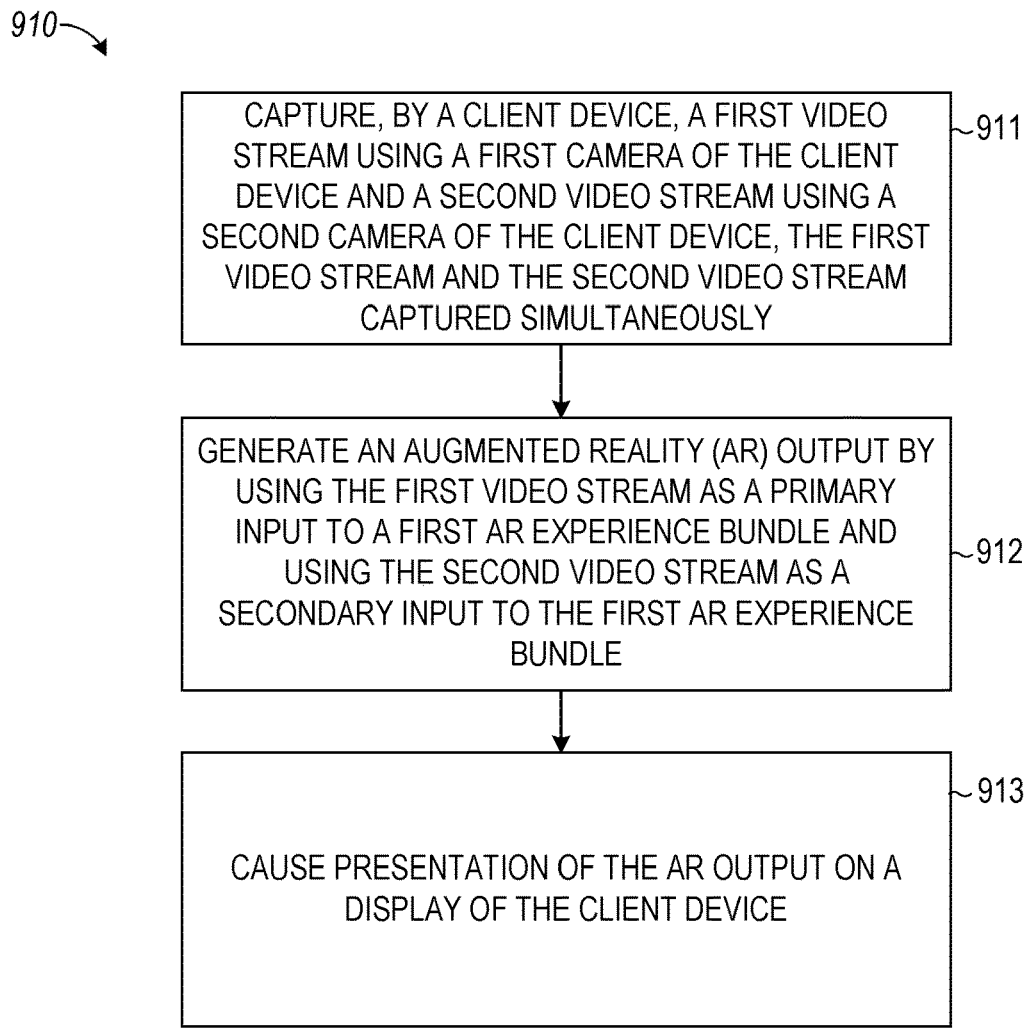

FIGS. 9A and 9B are flowcharts of processes 900 and 910 performed by the multi-camera AR experience system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the multi-camera AR experience system 224 (e.g., a client device 102 or a server) detects a real-world object depicted in a first image captured by a first camera of a client device, the client device comprising a second camera, as discussed above.

At operation 902, the multi-camera AR experience system 224 extracts one or more textures from the real-world object depicted in the first image, as discussed above.

At operation 903, the multi-camera AR experience system 224 selects a target object depicted in a second image captured by the second camera, the second image being captured by the second camera simultaneously with the first image captured by the first camera, as discussed above.

At operation 904, the multi-camera AR experience system 224 generates an augmented reality (AR) element comprising the target object modified based on the one or more textures extracted from the real-world object depicted in the first image, as discussed above.

At operation 905, the multi-camera AR experience system 224 causes display of the AR element within the second image, as discussed above.

At operation 911, the multi-camera AR experience system 224 (e.g., a client device 102 or a server) captures a first video stream using a first camera of the client device and a second video stream using a second camera of the client device, the first video stream and the second video stream captured simultaneously, as discussed above.

At operation 912, the multi-camera AR experience system 224 generates an augmented reality (AR) output by using the first video stream as a primary input to a first AR experience bundle and using the second video stream as a secondary input to the first AR experience bundle, as discussed above.

At operation 913, the multi-camera AR experience system 224 causes presentation of the AR output on a display of the client device, as discussed above.

Machine Architecture

Figure 10:
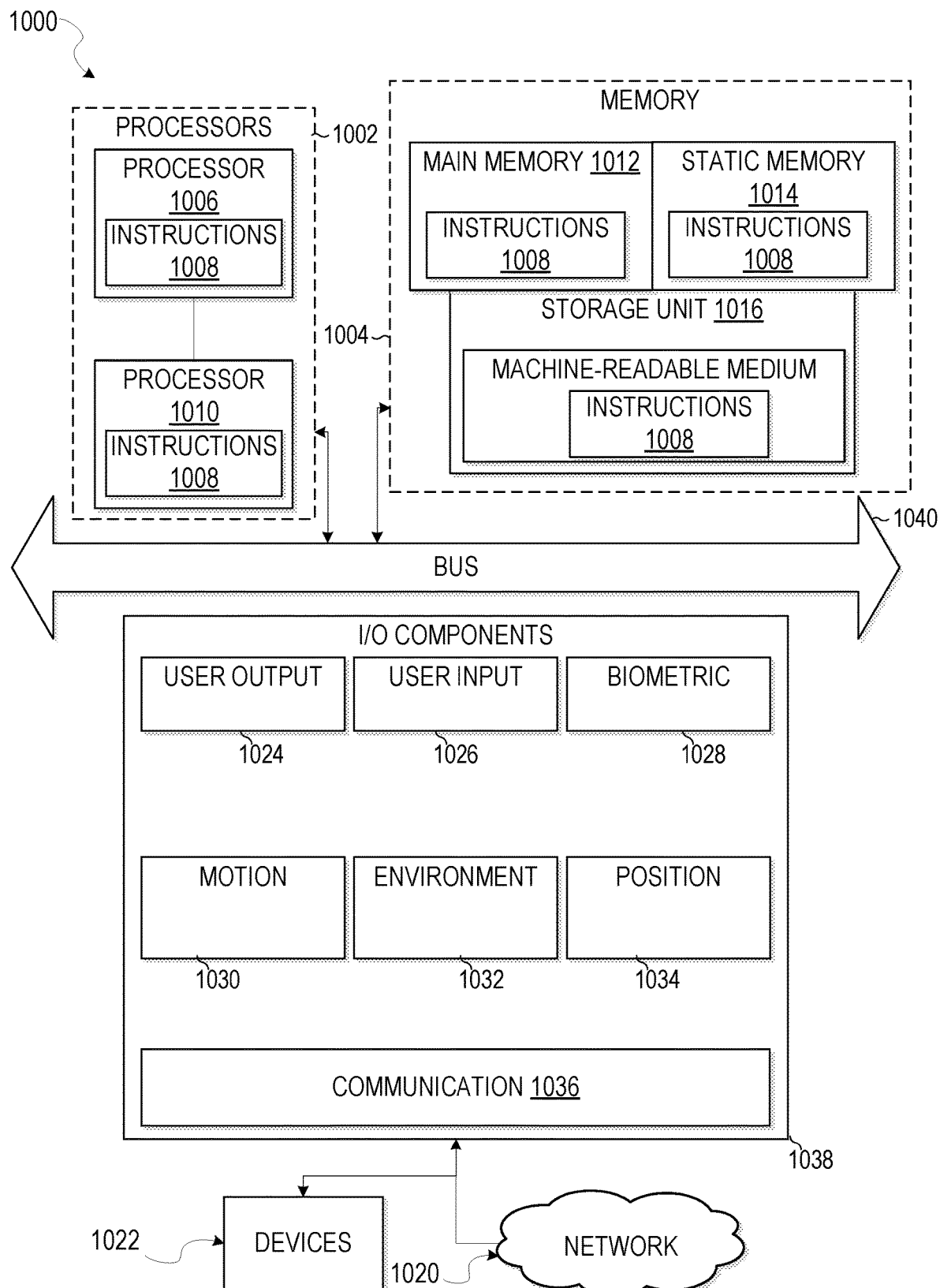
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
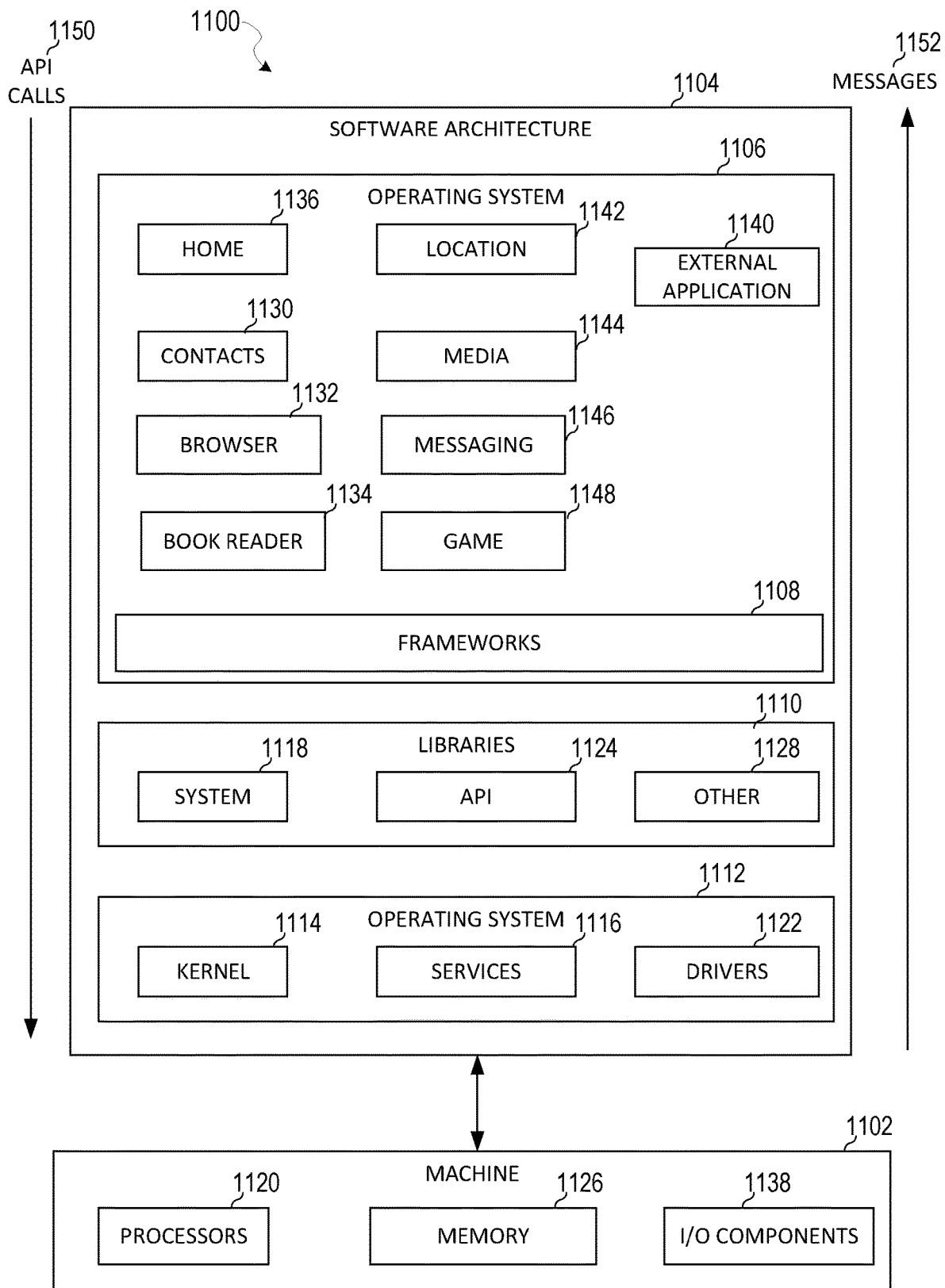
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
searching a plurality of augmented reality (AR) experience bundles to identify a subset of AR experience bundles that is associated with simultaneous activation of first and second cameras of a device;
displaying icons representing the subset of AR experience bundles, one or more of the displayed icons comprising a camera icon with forward and backward arrows indicative of simultaneous activation of the first and second cameras;
launching a first AR experience bundle in response to detecting selection of an icon representing the first AR experience bundle;
capturing, by the device, a first video stream using the first camera of the device and a second video stream using the second camera of the device, the first video stream and the second video stream captured simultaneously, the first camera comprising a first image sensor and the second camera comprising a second image sensor, the first image sensor being pointed in an opposite direction from the second image sensor and the first and second image sensors being activated simultaneously;
generating an AR output by using the first video stream as a primary input to the first AR experience bundle and using the second video stream as a secondary input to the first AR experience bundle;
causing presentation of the AR output on a display of the device;
obtaining lighting information from the second image sensor that was used to capture the second video stream; and
modifying one or more display attributes of images obtained by the first image sensor based on the lighting information from the second image sensor used to capture the second video stream.

2. The method of claim 1, further comprising:
receiving an input to modify a configuration of the first camera and the second camera.

3. The method of claim 2, further comprising:
in response to receiving the input, generating an updated AR output by using the second video stream as the primary input to the first AR experience bundle and using the first video stream as the secondary input to the first AR experience bundle; and
causing presentation of the updated AR output on a display of the device.

4. The method of claim 2, wherein the primary input is presented at a first display position within the AR output and the secondary input is presented at a second display position within the AR output, the method further comprising:
in response to receiving the input, generating an updated AR output wherein the primary input is presented at the second display position within the AR output and the secondary input is presented at the first position within the AR output; and
causing presentation of the updated AR output on a display of the device.

5. The method of claim 1, further comprising:
generating a cutout of facial elements depicted in images obtained from the first image sensor; and
superimposing, on top of an image obtained from the second image sensor, the cutout of the facial elements depicted in the images obtained from the first image sensor.

6. The method of claim 1, further comprising:
overlaying one or more facial features of a person depicted in the first video on a first real-world object depicted in the second video;
receiving input that selects a second real-world object in the second video by tapping a region at which the second real-world object is displayed; and
in response to receiving the input, moving the one or more facial features from being overlaid on the first real-world object in the second video to being overlaid on the second real-world object in the second video.

7. The method of claim 1, further comprising:
receiving an input to initiate the first AR bundle while at least one of the first camera and the second camera is not capturing video; and
in response to receiving the input, causing the first camera to capture the first video stream and the second camera to capture the second video stream, wherein a face depicted in an image obtained by the first image sensor is embedded into a real-world object depicted in image obtained by the second image sensor.

8. The method of claim 1, wherein the first camera is a front-facing camera on a display side of the device and the second camera is a rear-facing camera on a back side of the device.

9. The method of claim 1, further comprising:
identifying a first body part of a first person positioned within view of the first camera, the first body part being depicted in the first video;
identifying a second body part of the first person positioned within view of the second camera, the second body part being depicted in the second video; and
generating, based on the first and second videos, a combined image depicting a first AR element overlaid on the first body part and a second AR element overlaid on the second body part.

10. The method of claim 1, further comprising:
receiving a request to view a list of augmented reality (AR) experience bundles; and
while at least one of the first camera and the second camera is not capturing video, receiving an input that selects an option associated with simultaneous activation of the first camera and the second camera.

11. The method of claim 10, further comprising:
in response to receiving the input, displaying a plurality of display layouts;
receiving a selection of a first layout from the plurality of layouts;
causing the first camera to capture the first video stream and the second camera to capture the second video stream; and
displaying images included in the first video stream and second video stream on the display of the device according to the first display layout.

12. The method of claim 11, wherein the plurality of display layouts comprises at least one of:
a horizontal layout in which in images included in the first video stream are displayed on a top portion of a screen and the images included in the second video stream displayed on a bottom portion of the screen;

a vertical layout in which images included in the first video stream are displayed on a left portion of the screen and images included in the second video stream are displayed on a right portion of the screen;

a picture-in-picture (PIP) layout in which images included in the first video stream are displayed in full screen and images included in the second video stream are displayed within the full screen;

a green screen layout in which a portion of images included in the first video stream are superimposed on a portion of images included in the second video stream based on one or more object segmentation models; or a face builder layout in which cutouts of facial elements depicted in the images included in the first video stream are superimposed on top of images included in the second video stream.

13. The method of claim 1, wherein generating the AR output comprises:
   detecting a real-world object depicted in a first image included in the primary video stream;
   extracting one or more textures from the real-world object depicted in the first image;
   selecting a target object depicted in a second image included in the secondary video stream; and
   generating an AR element comprising the target object modified based on the one or more textures extracted from the real-world object depicted in the first image, the AR output including the AR element within the second image.

14. The method of claim 13, wherein the one or more textures depicts a face of a first user and the target object is a second user, the AR element depicting the second user with the face of the first user in place of a face of the second user.

15. The method of claim 14, wherein generating the AR output further comprises:
   extracting one or more textures depicting the face of the second user depicted in the second image; and
   generating a second AR element depicting the first user with the face of the second user in place of the face of the first user, the AR output including both the AR element and the second AR element.

16. The method of claim 1, further comprising:
   prior to activating the first and second cameras to capture the first and second videos, determining that the second camera is currently activated and being used to display an image;
   while the second camera is currently activated and being used to display an image, receiving a request to activate the first and second cameras simultaneously;
   in response to receiving the request to activate the first and second cameras simultaneously, storing an indication that the second camera was active before the request to activate the first and second cameras simultaneously was received;
   after generating the AR output, receiving a request to stop simultaneous activation of the first and second cameras; and
   in response to receiving the request to stop simultaneous activation of the first and second cameras, using the stored indication that the second camera was active before the request to activate the first and second cameras simultaneously was received to deactivate the first camera while maintaining the second camera active.

17. The method of claim 1, further comprising:
generating the first AR experience bundle by:
   presenting an AR experience development user interface for configuring the first AR experience bundle; and
   presenting a prompt in the AR experience development user interface that comprises an option for enabling simultaneous activation of multiple image sensors on a client device, wherein configuration data for the first AR experience bundle is updated to indicate that simultaneous activation of the multiple image sensors has been enabled in response to receiving input that selects the option.

18. A device comprising:
one or more computer processors; and
one or more computer-readable mediums storing instruction that, when executed by the one or more computer processors, cause the device to perform operations comprising:
   searching a plurality of augmented reality (AR) experience bundles to identify a subset of AR experience bundles that is associated with simultaneous activation of first and second cameras of the device;
   displaying icons representing the subset of AR experience bundles, one or more of the displayed icons comprising a camera icon with forward and backward arrows indicative of simultaneous activation of the first and second cameras;
   launching a first AR experience bundle in response to detecting selection of an icon representing the first AR experience bundle;
   capturing a first video stream using the first camera of the device and a second video stream using the second camera of the device, the first video stream and the second video stream captured simultaneously, the first camera comprising a first image sensor and the second camera comprising a second image sensor, the first image sensor being pointed in an opposite direction from the second image sensor and the first and second image sensors being activated simultaneously;
   generating an AR output by using the first video stream as a primary input to the first AR experience bundle and using the second video stream as a secondary input to the first AR experience bundle;
   causing presentation of the AR output on a display of the device;
   obtaining lighting information from the second image sensor that was used to capture the second video stream; and
   modifying one or more display attributes of images obtained by the first image sensor based on the lighting information from the second image sensor used to capture the second video stream.

19. A non-transitory computer-readable medium storing instruction that, when executed by one or more computer processors of a device, cause the device to perform operations comprising:
   searching a plurality of augmented reality (AR) experience bundles to identify a subset of AR experience bundles that is associated with simultaneous activation of first and second cameras of the device;
   displaying icons representing the subset of AR experience bundles, one or more of the displayed icons comprising a camera icon with forward and backward arrows indicative of simultaneous activation of the first and second cameras;
   launching a first AR experience bundle in response to detecting selection of an icon representing the first AR experience bundle;

capturing a first video stream using the first camera of the device and a second video stream using a second camera of the device, the first video stream and the second video stream captured simultaneously, the first camera comprising a first image sensor and the second camera comprising a second image sensor, the first image sensor being pointed in an opposite direction from the second image sensor and the first and second image sensors being activated simultaneously;

generating an AR output by using the first video stream as a primary input to the first AR experience bundle and using the second video stream as a secondary input to the first AR experience bundle;

causing presentation of the AR output on a display of the device;

obtaining lighting information from the second image sensor that was used to capture the second video stream; and modifying one or more display attributes of images obtained by the first image sensor based on the lighting information from the second image sensor used to capture the second video stream.

20. The non-transitory computer-readable medium of claim 19, wherein the first camera is a front-facing camera on a display side of the device and the second camera is a rear-facing camera on a back side of the device.

* * * * *